United States Patent [19]

Lahti

[11] Patent Number: 4,789,925
[45] Date of Patent: Dec. 6, 1988

[54] VECTOR DATA LOGICAL USAGE CONFLICT DETECTION

[75] Inventor: Archie E. Lahti, Fridley, Minn.

[73] Assignee: Unisys Corporation, Blue Bell, Pa.

[21] Appl. No.: 761,140

[22] Filed: Jul. 31, 1985

[51] Int. Cl.$^4$ .......................... G06F 9/38; G06F 11/28
[52] U.S. Cl. ..................................... 364/200; 364/730
[58] Field of Search ................ 364/730, 736, 200, 900

[56] References Cited

U.S. PATENT DOCUMENTS 4,025,771  5/1977  Lynch, Jr. et al. .................. 364/200
4,532,589  7/1985  Shintani et al. ..................... 364/200

Primary Examiner—Gareth D. Shaw
Assistant Examiner—Paul Kulik
Attorney, Agent, or Firm—Charles A. Johnson; Laurence J. Marhoefer

[57] ABSTRACT

A system for detecting and resolving logical usage conflicts is described for use in a scientific data processing system. A plurality of pipelined overlapping macro instructions request access to the system memory. Often the information required by a subsequent instruction is not available until an earlier overlapped instruction has been completed thereby creating a conflict. This conflict is sensed by the subsequent instruction and memory access is delayed a number of memory cycles until the correct information is available at which time the subsequent instruction is allowed to proceed. This allows a scientific vector support processor having a high degree of asynchronism to be able to produce results as if no overlap existed to provide program execution results as if each instruction were executed serially to completion in the proper program order. There are three categories of data logical usage conflicts. First, a Write/Read conflicts occurs where there is an attempt to read a result vector element of an earlier instruction before the result vector is written. Next, a Read/Write conflict occurs when there is an attempt to overwrite a source vector element of an earlier instruction before it has been read. Finally, a Write/Write conflict occurs where there is an attempt to overwrite a result vector element of an earlier instruction before it is written.

17 Claims, 39 Drawing Sheets

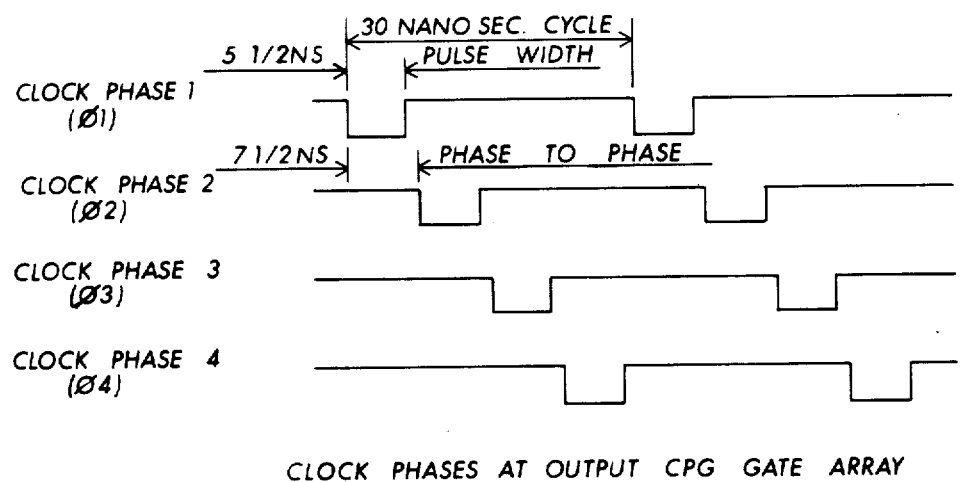
CLOCK PHASES AT OUTPUT CPG GATE ARRAY
*FIG. 7*
*FIG. 6*
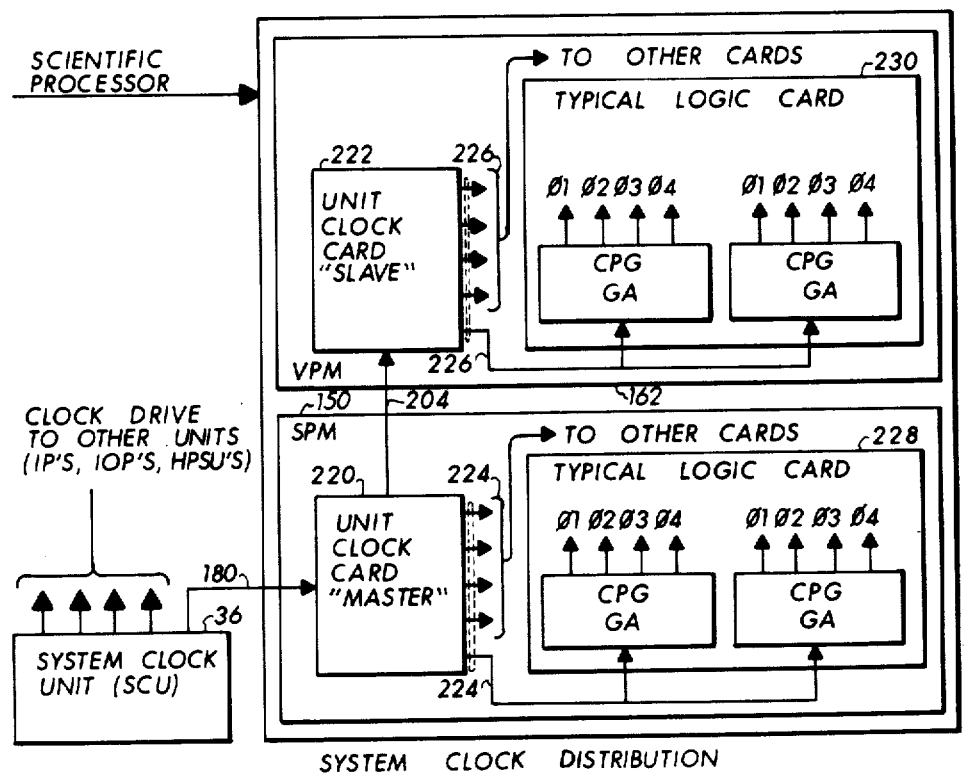
SYSTEM CLOCK DISTRIBUTION

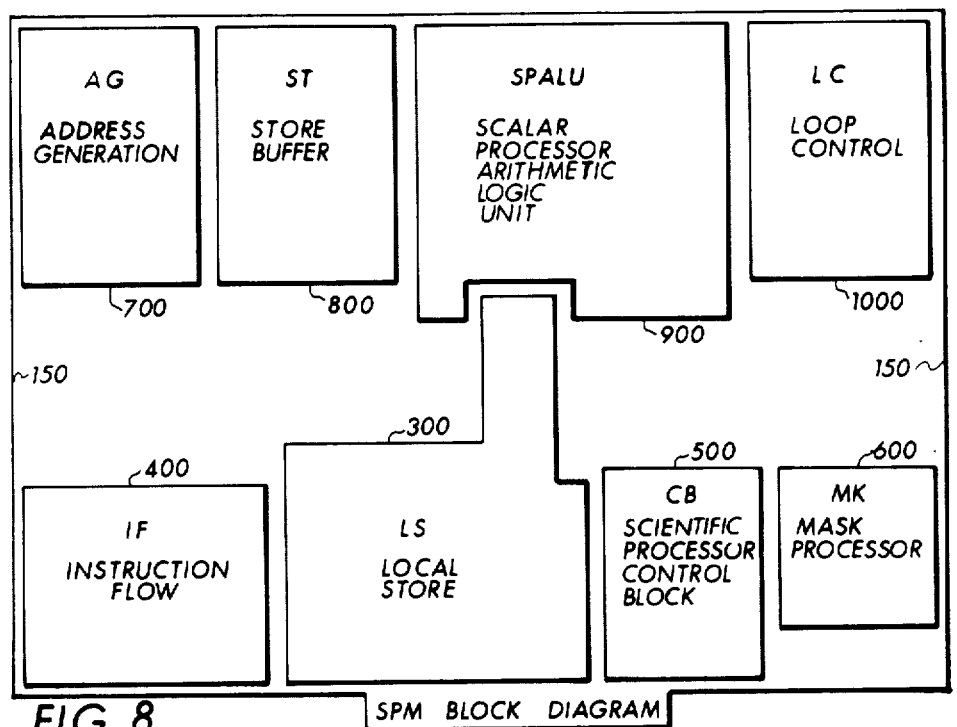
FIG. 8    SPM BLOCK DIAGRAM
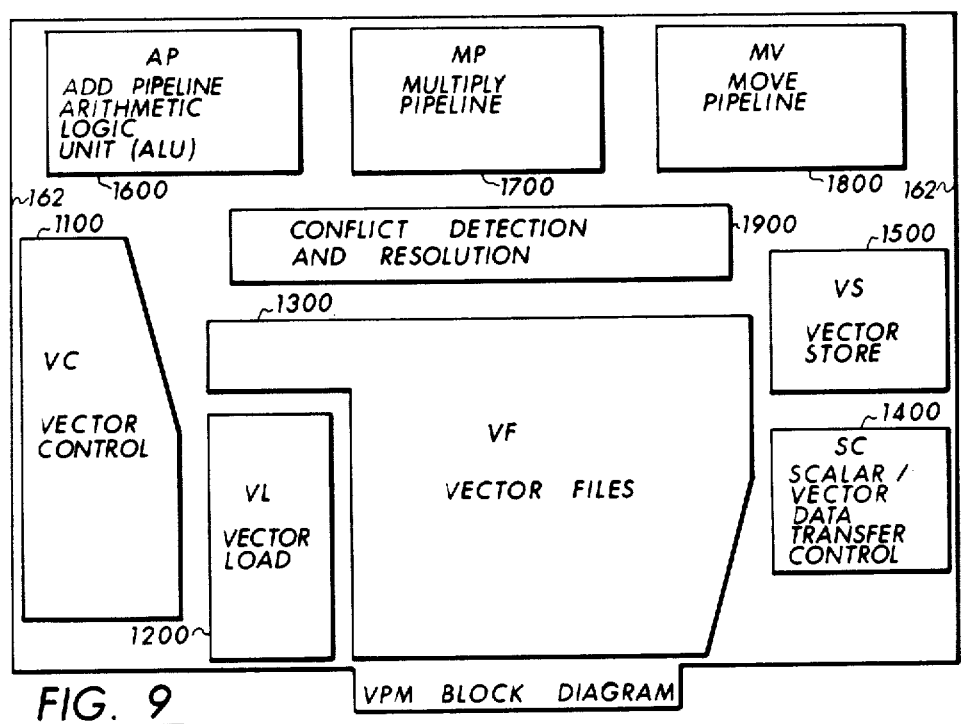
FIG. 9    VPM BLOCK DIAGRAM

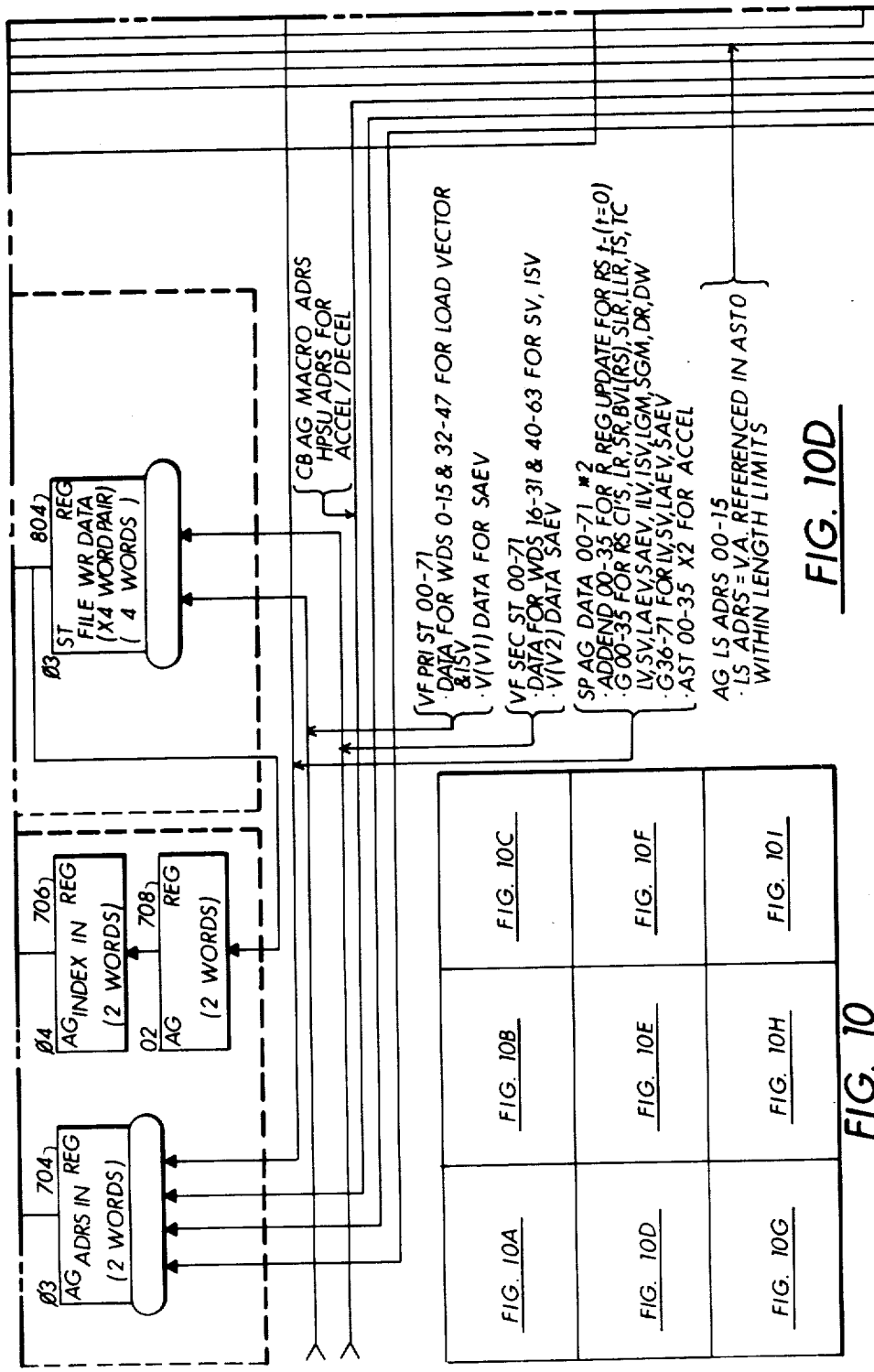

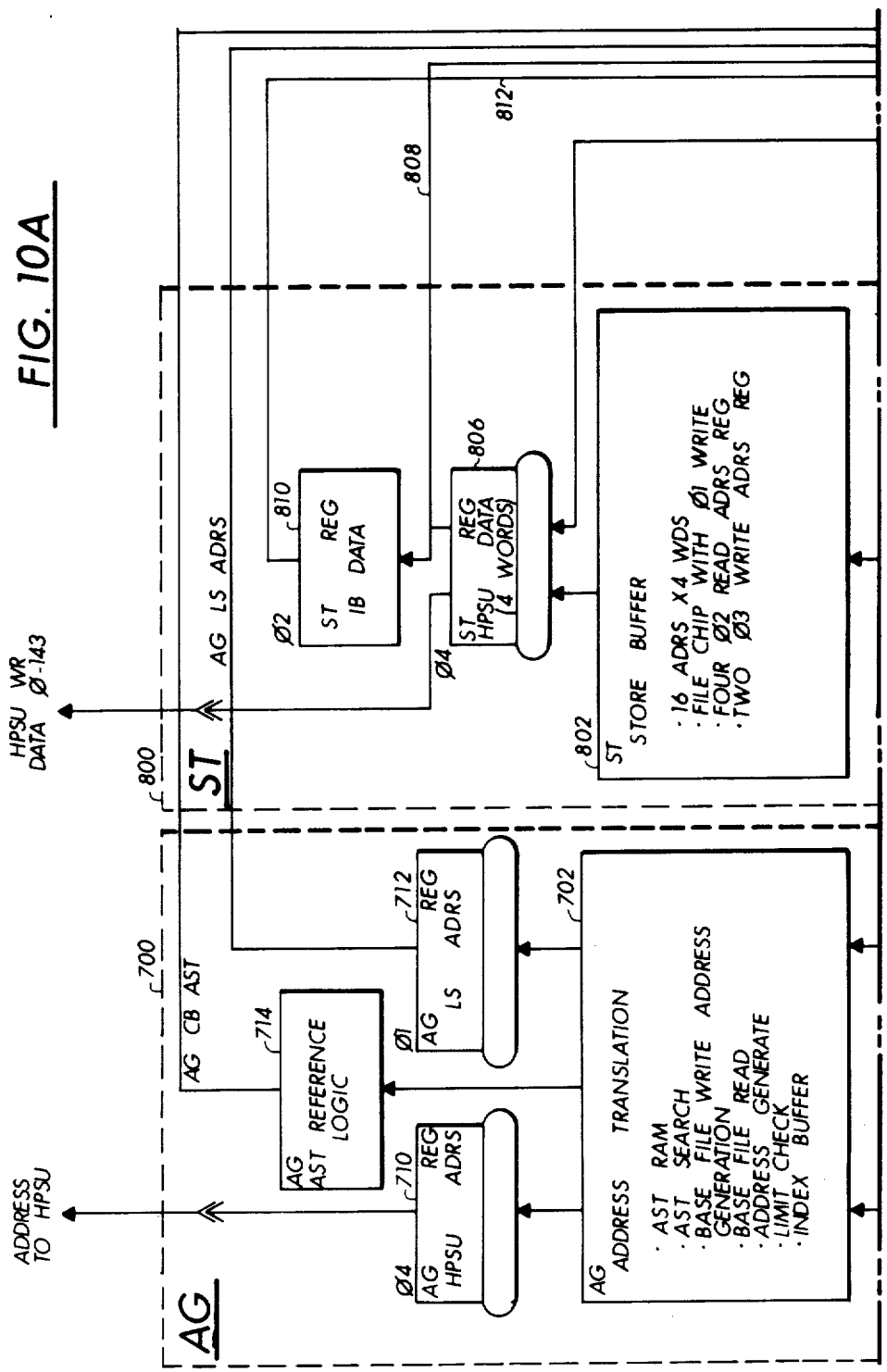

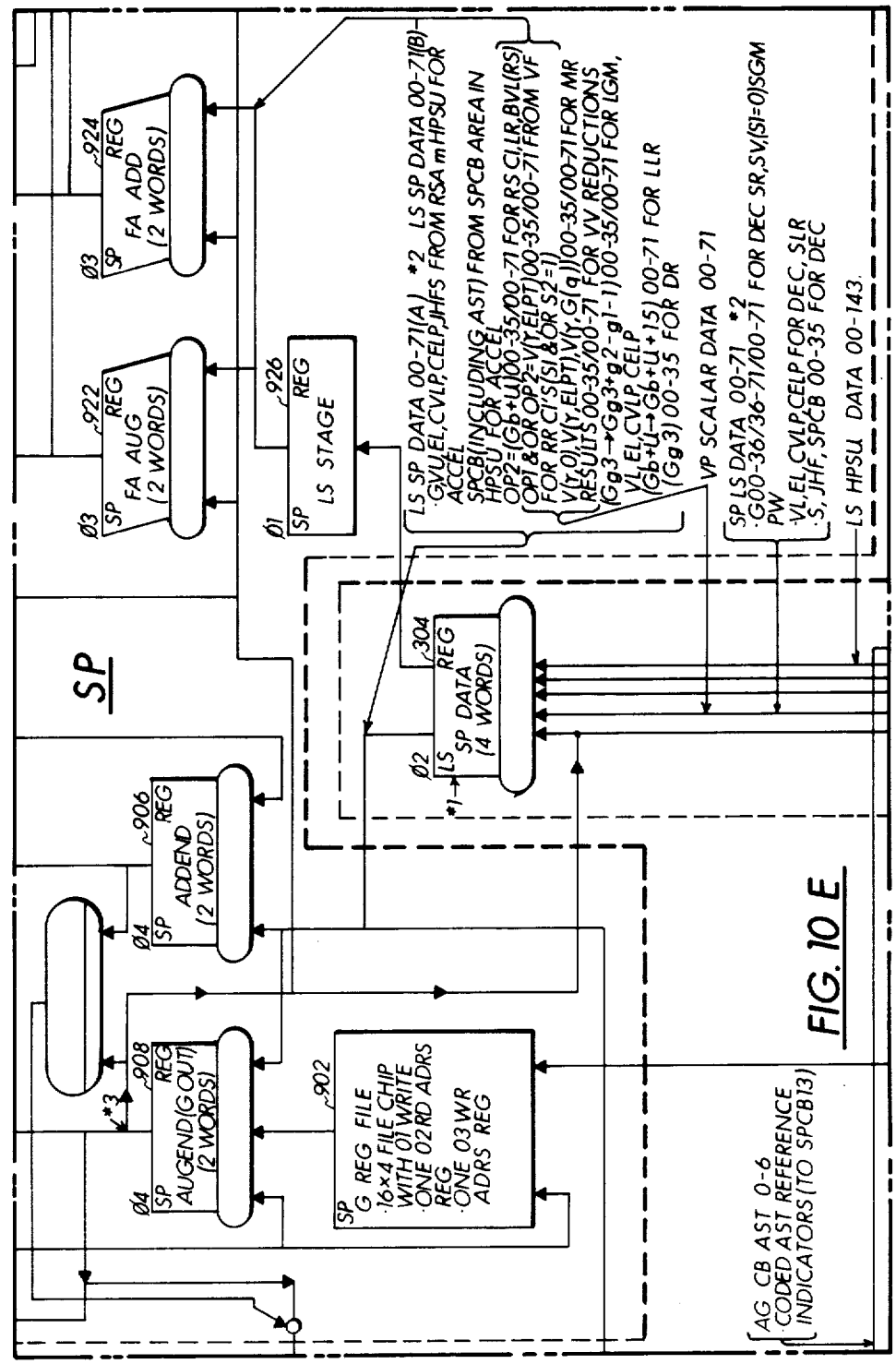

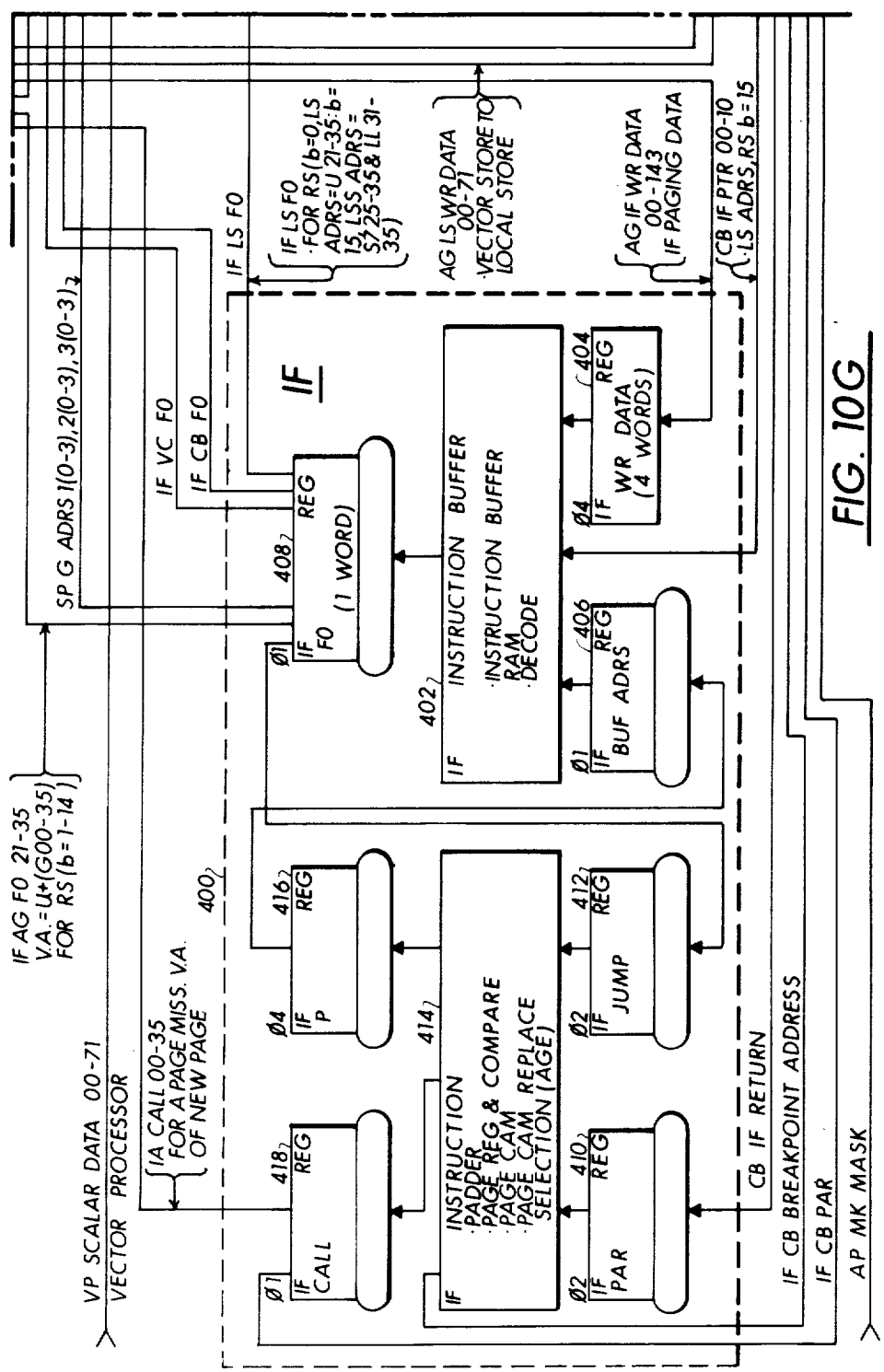

BLOCK DIAGRAM OF ONE TYPICAL CONFLICT DETECTOR

MAIN CHAIN CONFLICT

| READ / WRITE (LATE) | AP | | MP | | MV | VS | | SC | |
|---|---|---|---|---|---|---|---|---|---|
| | OP1 | OP2 | OP1 | OP2 | OP2 | OP1 | OP2 | OP1 | OP2 |
| AP OP3 | ✕ | ✕ | 6 | 6 | 9 | 12 | 12 | 15 | 15 |
| MP OP3 | CHIP3 | 3 | ✕ | ✕ | | 12 | 12 | 15 | 15 |
| MV OP3 | 3 | 3 | 6 | 6 | ✕ | 11 | 11 | 14 | 14 |
| VL OP3 | 2 | 2 | 5 | 5 | 8 | 11 | 11 | 13 | 13 |
| VL OP4 | 1 | 1 | 4 | 4 | 8 | 10 | 10 | 13 | 13 |
| SC OP3 | 1 | 1 | 4 | 4 | 7 | 10 | 10 | ✕ | ✕ |

46 TOTAL DETECTORS

| READ / WRITE (LATE) | AP | | MP | | MV | VS | | SC | |
|---|---|---|---|---|---|---|---|---|---|
| | OP1 | OP2 | OP1 | OP2 | OP2 | OP1 | OP2 | OP1 | OP2 |
| AP OP 5 | 18 | 18 | 17 | 17 | 16 | 20 | 20 | 19 | 19 |
| MP OP 5 | 18 | 18 | 17 | 17 | 16 | 20 | 20 | 19 | 19 |

18 TOTAL DETECTORS
SECOND RANK FOR AP & MP BECAUSE OF LONG LATENCY (9 CYCLES)
USED WHEN HAVE SEVERAL (≥1) INSTR'S TO SAME PIPE (E.G. AP+MP)
WITH EARLIEST HAVING SMALL ELCNT

FIG. 17

| READ / WRITE (EARLY) | AP | MP | MV | VL | | SC |
|---|---|---|---|---|---|---|
| | OP 3 | OP 3 | OP 3 | OP 3 | OP 4 | OP 3 |
| AP OP1 | ✕ | 34 | 28 | 32 | *32 | 34 |
| AP OP2 | ✕ | 34 | 28 | 32 | *32 | 34 |
| MP OP1 | 24 | ✕ | 27 | 31 | *31 | 27 |
| MP OP2 | 24 | ✕ | 27 | 31 | *31 | 27 |
| MV OP2 | 23 | 23 | ✕ | 30 | *30 | 33 |
| VS OP1 | 22 | 22 | 26 | ✕ | ✕ | 26 |
| VS OP2 | 22 | 22 | 26 | ✕ | ✕ | 26 |
| SC OP1 | 21 | 21 | 25 | 29 | *29 | ✕ |
| SC OP2 | 21 | 21 | 25 | 29 | *29 | ✕ |

*NOTE: THESE COMPARATORS HAVE VC OP4 VL G FLNG & FLVLD AS ONE OF ITS INPUTS

43 TOTAL DETECTORS

FIG. 18

| READ / WRITE | AP | | MP | |
|---|---|---|---|---|
| | OP1 | OP2 | OP1 | OP2 |
| VL OP4 | *1A | *1A | *4A | *4A |
| VL OP3 | 1A | 1A | 4A | 4A |

8 DETECT

| WRITE / WRITE | AP | | MP | |
|---|---|---|---|---|
| | OP3 | OP5 | OP3 | OP5 |
| VL OP4 | *2A | *2A | *5A | *5A |
| VL OP3 | 2A | 2A | 5A | 5A |

8 DETECT

| WRITE / READ | AP | | MP | |
|---|---|---|---|---|
| | OP3 | OP5 | OP3 | OP5 |
| VS OP2 | 3A | 3A | 6A | 6A |
| VS OP1 | 3A | 3A | 6A | 6A |

8 DETECT

FIG. 19

WRITE

| WRITE EARLY / WRITE LATE | AP | MP | VP | VL | | SC |
|---|---|---|---|---|---|---|
| | OP3 | OP3 | OP3 | OP3 | OP4 | OP3 |
| AP OP3 | ✕ | A-1 | B-4 | B-5 | B-5 | B-4 |
| MP OP3 | A-1 | ✕ | B-4 | B-5 | B-5 | B-4 |
| MV OP3 | A-2 | A-2 | ✕ | B-6 | B-6 | C-7 |
| VL OP3 | A-2 | A-2 | C-7 | ✕ | ✕ | C-7 |
| VL OP4 | A-3 | A-3 | C-8 | ✕ | ✕ | C-8 |
| SC OP3 | A-3 | A-3 | C-8 | 8-6 | 8-6 | ✕ |

28 DETECTORS

| WRITE EARLY / WRITE LATE | MV | SC | VL | |
|---|---|---|---|---|
| | OP3 | OP3 | OP3 | OP4 |
| AP OP5 | M-1 | M-1 | M-2 | M-2 |
| MP OP5 | M-1 | M-1 | M-2 | M-2 |

8 DETECTORS

FIG. 20

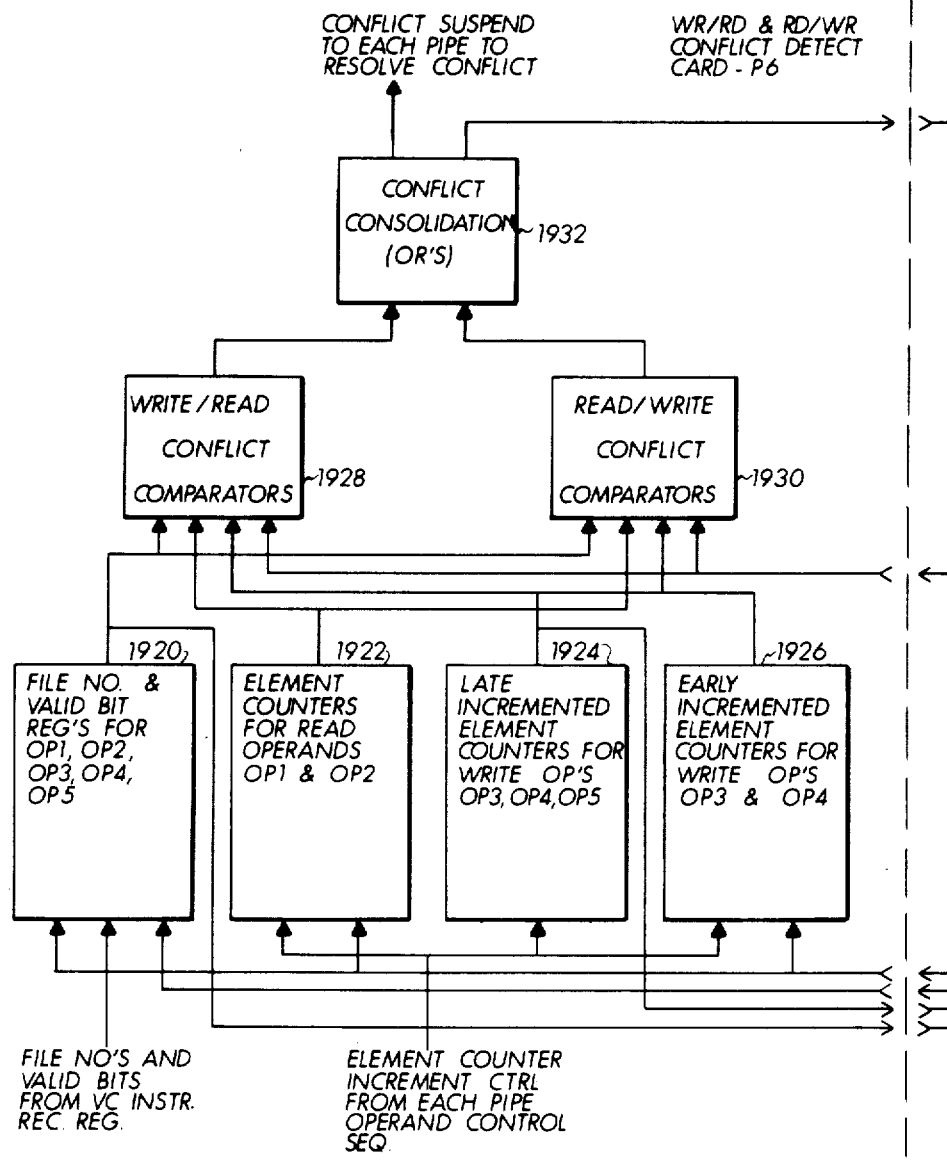

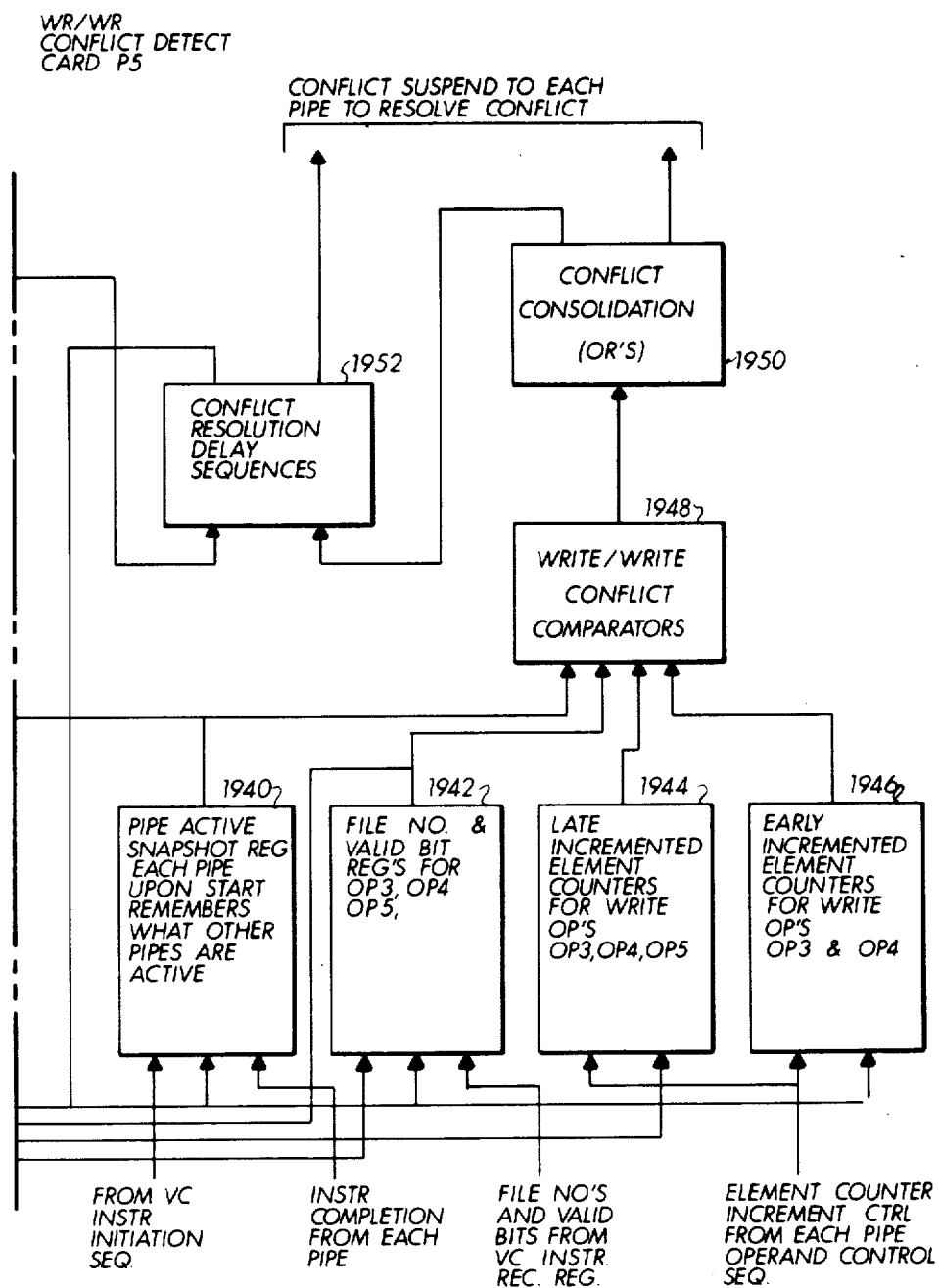

| COM-POSITE T BIT | GOP ENABLE | | | VOP ENABLE | | | | VOP-1 FILE NO. | VOP-2 FILE NO. | VOP-3 FILE NO. | VOP-4 FILE NO. | PARITY BITS P0-P6 |
|---|---|---|---|---|---|---|---|---|---|---|---|---|
| | 0 | 1 | 2 | 1 | 2 | 3 | 4 | | | | | |
| 25 | 26-28 | | | 29-32 | | | | 33-36 | 37-40 | 41-44 | 45-48 | 49-55 |

FIG. 23B

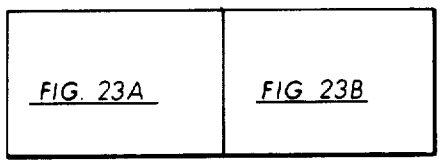

FIG. 23

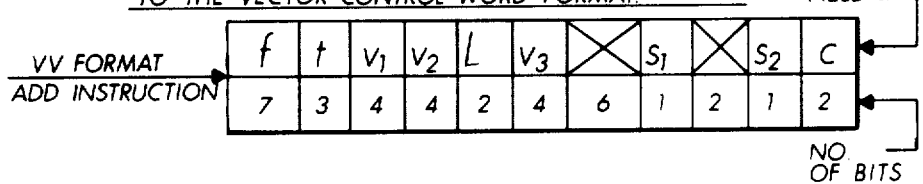

f = 042 - OP-CODE FOR VV-ADD
t = 3 - DOUBLE PRECISION FP
$v_1$ = 4 - VECTOR FILE NO.4 (AUGEND)
$v_2$ = 5 - G-REGISTER NO.5 (AUGEND)
$l$ = 0 - ELCNT (NO. ELEMENTS)
$v_3$ = 6 - VECTOR FILE NO.6 (SUM OR RESULT)
$s_1$ = 1 - VOP
$s_2$ = 0 - GOP
c = 3 - DO ELEMENTS WITH ONE IN MASK

VECTOR CONTROL WORD FOR EXAMPLE VV FORMAT ADD INSTRUCTION. OCTAL VALUE FOR EACH FIELD.

| 3 | 0 | 0 | 2 | 40 | 0 | 3 | 1 | 2 | 14 | 4 | 5 | 6 | 6(X) | 066 |

FIG. 24

FORMAT OF VECTOR CONTROL WORD

| VECTOR FILE PATTERN | BRKPT | SPARE | OPERATION CONTROL | MASTER BIT PIPE SELECT | OPERATION MODIFIER | | | T FIELD |
|---|---|---|---|---|---|---|---|---|
| | | | | | MPI | 0 | 1 | |
| 0-3 | 4 | 5 | 6-13 | 14-19 | 20 | — | 22 | 23-24 |

BITS 0-3 — VF PATTERN FOR THIS INSTR.

BIT 4 — BREAKPOINT ARMING SIGNAL-TO PIPE.

BIT 5 — SPARE BIT

BITS 6-13 — UNIQUE DEFENITION OF INSTRUCTION TO EXECUTE OR OPERATION TO PERFORM. (EG.-USED BY AP, MP, MV, AS MICRO CODE ENTRY ADDRESS)

BITS 14-19 — PIPE SECECT FIELD

BITS 20-22 — THE MULTIPLE PASS INSTRUCTION (MPI) BIT IS SET FOR CERTAIN INSTRUCTIONS THAT REQUIRE 2 PIPES, TO PARTICIPATE IN THE EXECUTION. AN OCTAL VALUE=2 IN THE FIELD SPECIFIES A GIV INSTR.

BIT 23-24 — FROM INSTRUCTION T(TYPE) FIELD (S).

BIT 25 — COMPOSITE T-BIT. USED TO SPECIFY THAT THE ELCNT IS SP OR DP.

BITS 26-28 — G-REGISTER OPERAND ENABLE BITS 0 & 1 DENOTE THAT OP1 OR OP2, RESPECTIVELY, FOR VV FORMAT INSTRUCTIONS ARE FROM A G-REG.

BITS 29-32 — VECTOR OPERAND ENABLE DENOTE THAT THE CORRESPONDING FILE NO. IS USED BY THIS INSTRUCTION USED TO ENABLE CONFLICT DETECTION.

BITS 33-36 — VOP 1   FILE NUMBER USED FOR ADRS.
BITS 37-40 — VOP 2         DITTO
BITS 41-44 — VOP 3         DITTO
BITS 45-48 — VOP 4         DITTO
BITS 49-55 — PARITY BITS:
    P0 -  0-5        P4 - 25-32
    P1 -  6-13       P5 - 33-40
    P2 - 14-19       P6 - 41-48
    P3 - 20-24

FIG. 23A

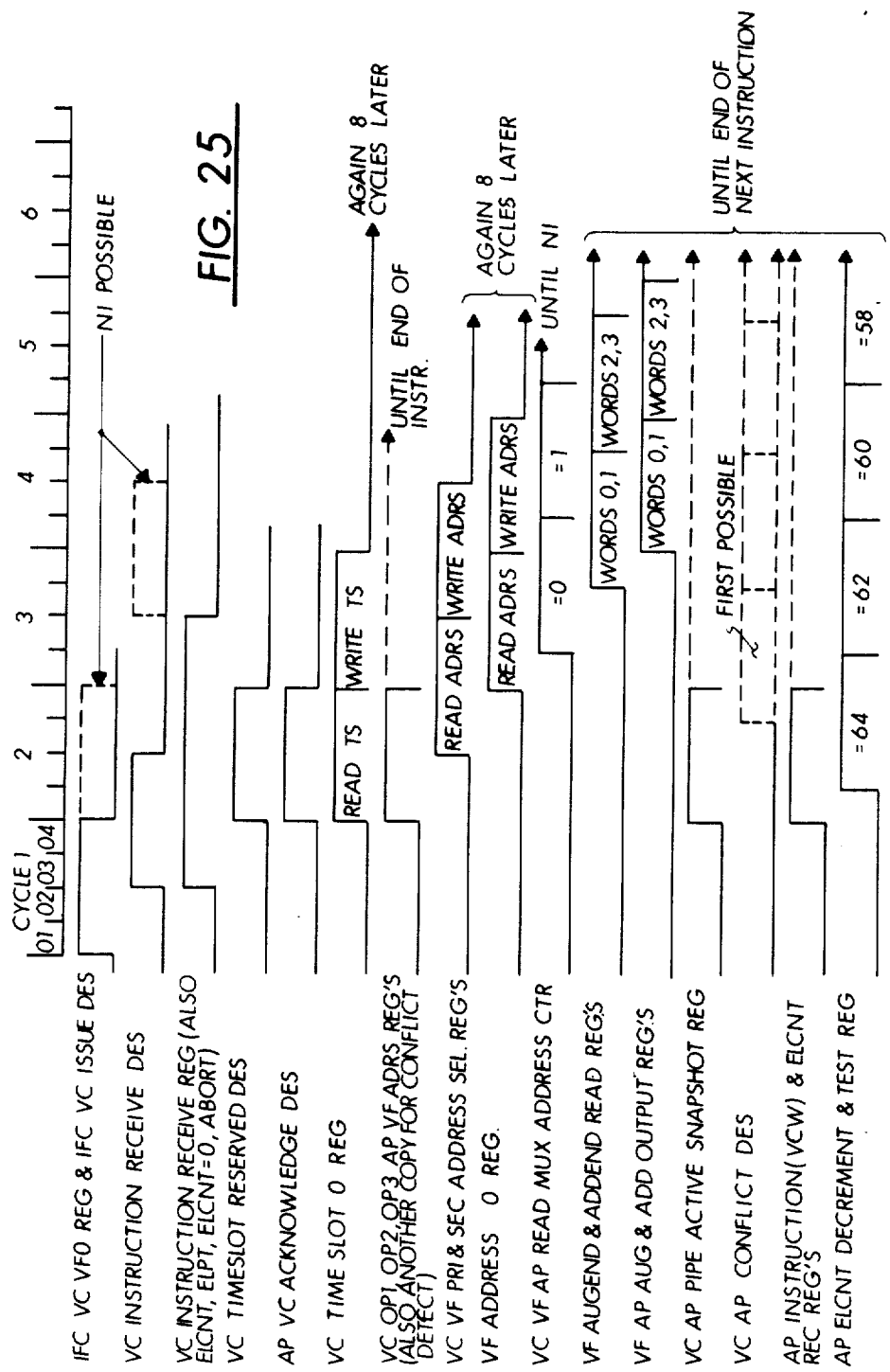

FIG. 31

| MODE CONTROL | DATA EN 1 | DATA EN 2 | GATE TO | |
|---|---|---|---|---|
| | | | 10-BIT REGISTER | 1-BIT LATCH |
| L | L | L | IN REG DATA | IN LATCH DATA |
| L | L | H | IN REG DATA | O'S * |
| L | H | L | IN REG DATA | O'S * |
| L | H | H | IN REG DATA | O'S * |
| H | L | L | IN REG DATA | IN LATCH DATA |
| H | L | H | O'S ** | IN LATCH DATA |
| H | H | L | O'S ** | IN LATCH DATA |
| H | H | H | O'S ** | IN LATCH DATA |

\* ACTIVATION OF LATCH CLOCK AND LATCH CLOCK EN WILL FORCE 10 BIT REGISTER TO HOLD LAST CLOCKED DATA PATTERN.
\*\* REGISTER OUTPUT WILL CLOCK TO ZEROS.
ENABLES

FIG. 29

| IN ZEROES | IN UP SEL 2 | IN UP SEL 1 | SELECTED DATA TO UPPER |
|---|---|---|---|
| L | L | L | IN DATA |
| L | L | H | ADDER |
| L | H | X | LOWER REGISTER |
| H | X | X | ZEROES |

X = DON'T CARE STATE

FIG. 26

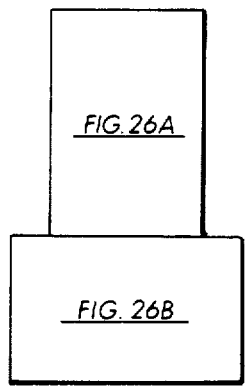

DC = DON'T CARE
I = INACTIVE
A = ACTIVE

| BIT 1 | | BIT 2 | | BIT 3 | | BIT 4 | | BIT 5 | | OUTPUT OF COMPARE NETWORK |
|---|---|---|---|---|---|---|---|---|---|---|
| D1 | H1 | D2 | H2 | D3 | H3 | D4 | H4 | D5 | H5 | D ≧ H |
| D1 | G1 | D2 | G2 | D3 | G3 | D4 | G4 | D5 | G5 | D ≧ G |
| B1 | H1 | B2 | H2 | B3 | H3 | B4 | H4 | B5 | H5 | B ≧ H |
| B1 | G1 | B2 | G2 | B3 | G3 | B4 | G4 | B5 | G5 | B ≧ G |
| L | H | DC | DC | DC | DC | DC | DC | DC | DC | I |
| H | L | DC | DC | DC | DC | DC | DC | DC | DC | A |
| | | L | H | DC | DC | DC | DC | DC | DC | I |
| | | H | L | DC | DC | DC | DC | DC | DC | A |
| | | | | L | H | DC | DC | DC | DC | I |
| | | | | H | L | DC | DC | DC | DC | A |
| | | | | | | L | H | DC | DC | I |
| | | | | | | H | L | DC | DC | A |
| | | | | | | | | L | H | I |
| | | | | | | | | H | L | A |
| | | | | | | | | | | A |

TRUTH TABLE FOR = AND ≧ COMPARE NETWORKS

CONFLICT DETECT COMPARATOR

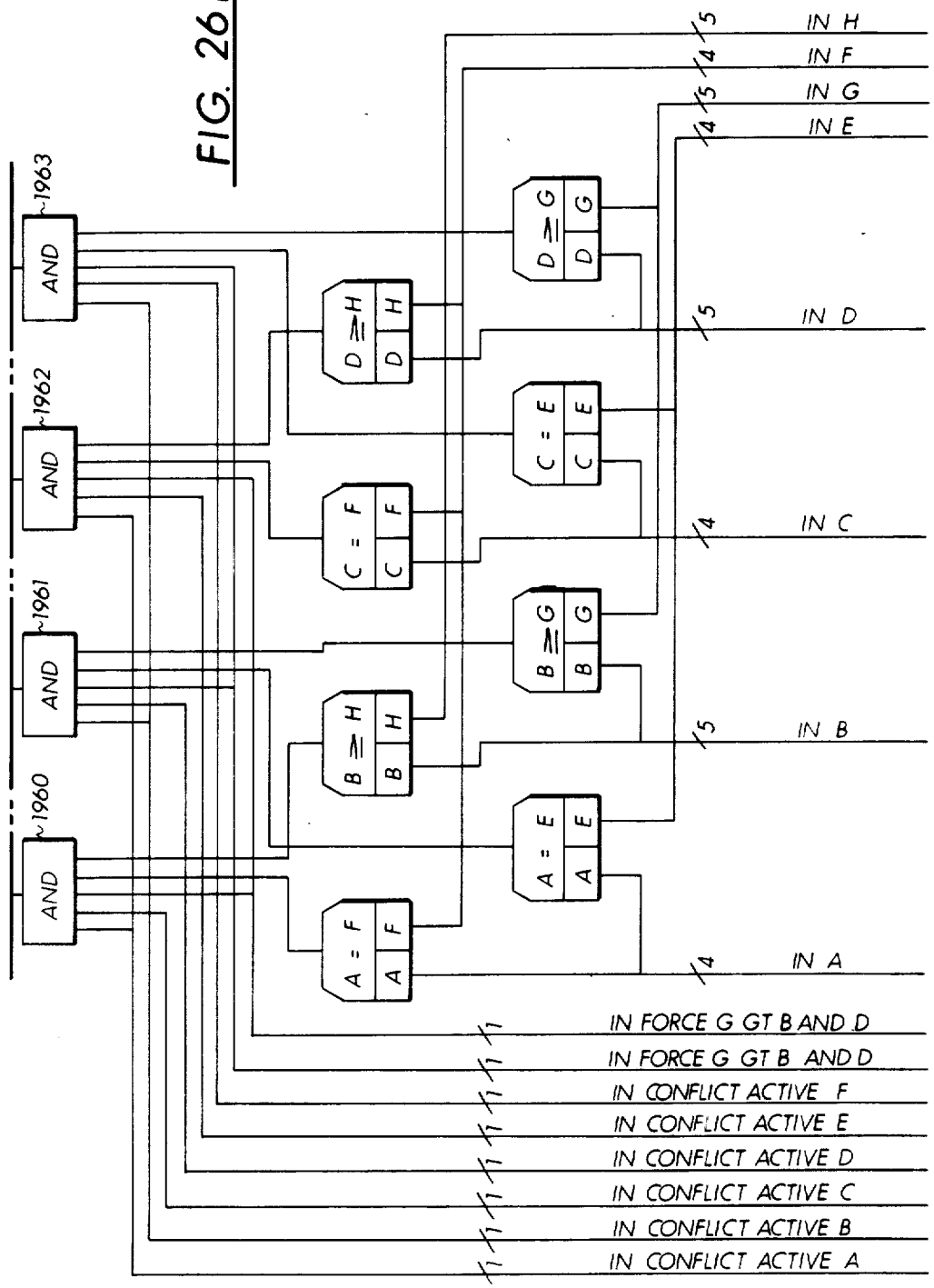

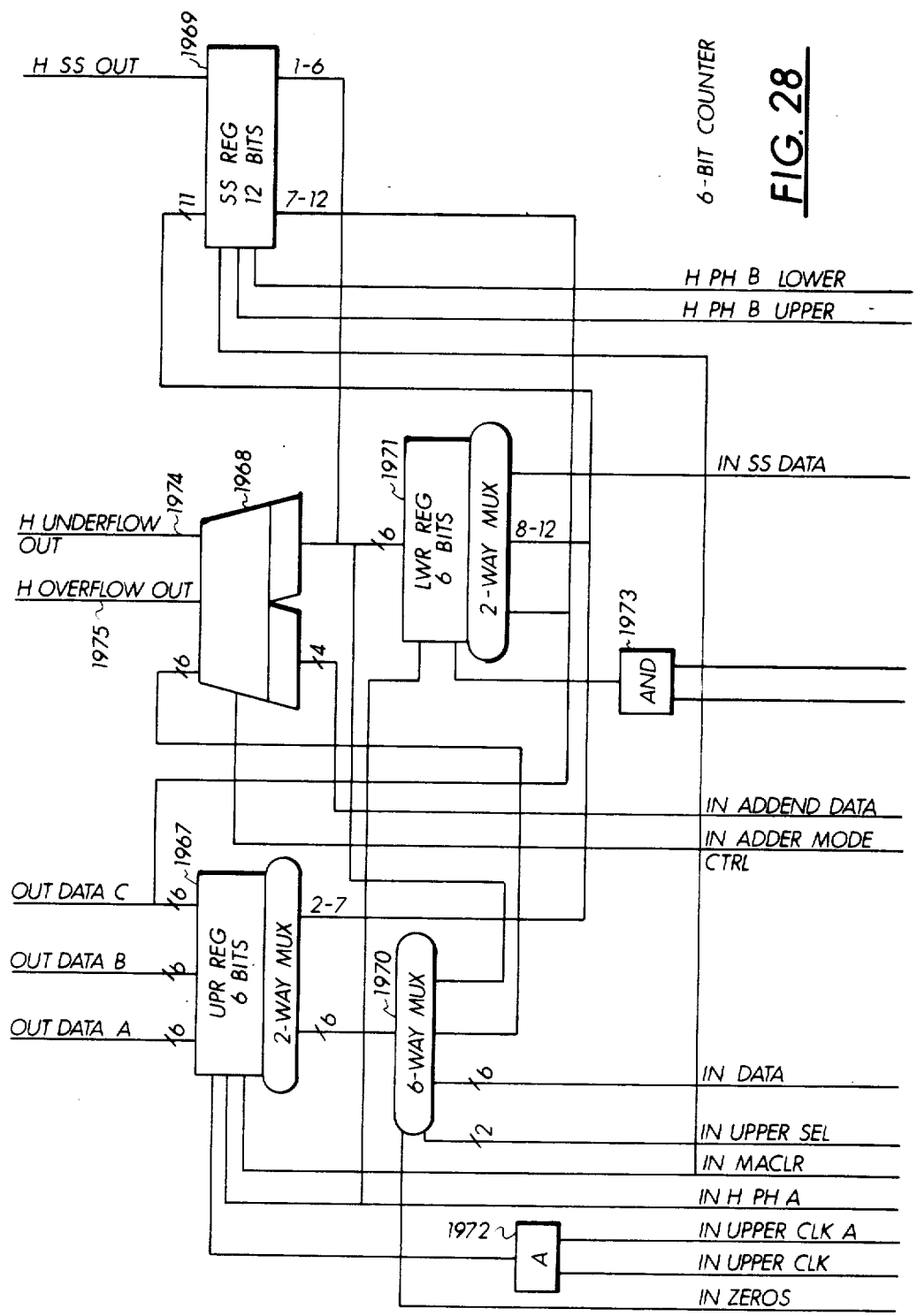

VECTOR DATA LOGICAL USAGE CONFLICT DETECTION

RELATED PATENT APPLICATIONS

The following co-pending patent applications are assigned to the assignee of this invention, and their teachings are incorporated herein by reference:

Title: HIGH PERFORMANCE STORAGE UNIT
  Inventor: James H. Scheuneman
  Ser. No.: 596,130
  Filed Apr. 2, 1984 U.S. Pat. No.: 4,633,434
Title: MULTIPLE UNIT ADAPTER
  Inventor: James H. Scheuneman
  Ser. No.: 596,205
  Filed: Apr. 2, 1984
  U.S. Pat. No.: 4,722,052
Title: A SCIENTIFIC PROCESSOR
  Inventors: Louis B. Bushard, Larry L. Byers, James R. Hamstra, Charles H. Homan, Archie E. Lahti, John T. Rusterholz
  Ser. No.: 761,201
  Filed: July 31, 1985

BACKGROUND OF THE INVENTION

A. Field of the Invention

This invention relates to programmable digital data processors, with particular emphasis on those processors which process vector instructions. More specifically, it relates to those data processors which utilize a pipelined approach to the processing of these vector instructions.

In the development and advance in data processing systems there has been an ever-increasing emphasis on increasing the data processing rate. This desire for higher speed has led us to different approaches to accomplish this. One approach was to use separate processing elements to overlap the execution of instructions. This, of course, has automatically brought with it the need of asynchronous operation, since the separate processors accomplished their individual tasks in different time periods. This asynchronous operation of the multiple processing elements caused memory access conflicts, since many times there were concurrent requests for the same memory location. This invention then specifically relates to a system for resolving these conflicts caused by the asynchronous operation.

B. Prior Art

Increases in computing rates have been achieved through advances in physical technologies relating to hardware and hardware functioning. The advent of integrated circuitry gave rise to circuit components operable at very fast computing rates, and capable of performing complex functions while remaining economically feasible. Access and cycle time of memories has also been markedly decreased.

In addition to the changes and developments in the hardware, there have been continuing advances in the organizational architecture of data processing systems that provide for ever-increasing utilization of the various data processing components. While many examples of optimization of utilization of the components comprising the data processing systems can be described, attention will be directed to the concept of increasing data processing rates by providing for an overlap of macro instruction execution.

It has been known for some time that instructions in data processing systems that basically provide for the steps of instruction procurement and instruction decoding, instruction operation, and storage of results, could be overlapped such that once an existing instruction was procured from the memory and the current instruction passed into execution, the memory would be available for accessing for the next instruction. This allowed overlapping of the instructions primarily based upon the availability of access to the memory unit. This type of instruction overlapping was most common in the data processors that involved so-called hardwired instruction repertoire and control.

Later developments lead to data processing systems that utilized a repertoire of macro instructions each of which performed some predetermined function in the data processing system. The macro instructions, characteristically at the user level, are programmed and stored in a memory unit for retrieval and execution as the particular program progresses. In systems of this type, a control store is utilized for storing sets of micro instructions, each one of the stored sets relating to an associated one of the macro instructions. The execution of a selected macro instruction is accomplished by the execution of each one of the micro instructions in the corresponding set thereof. In the execution of each micro instruction, control signals are produced and fed to the Arithmetic Processor to control the processing of data in accordance with the controls specified by each of said micro instructions. In current technology the control store would be either a Random Access Memory (RAM) or a Read Only Memory (ROM). The ROM has the advantage of relatively faster operating rates in that the regenerative cycle for the RAM is not needed, but has the relative disadvantage that the predetermined sets of micro instructions must be totally and completely defined prior to fabrication since the conditions that define each micro instruction are determined during fabrication. The RAM has the relative disadvantage of being somewhat slower in overall operation rate as time is required for the regeneration cycle following each read operation. However, the RAM has the relative advantage of providing versatility for the control store in that the sets of micro instructions can be altered by simply writing new control micro instructions into the control memory.

BRIEF DESCRIPTION OF THE INVENTION

A. Objects of the Invention

Accordingly, it is an object of the present invention to provide an improved conflict detection and resolution system for use in an array scientific data processing system.

It is also an object of the present invention to provide a conflict detection and resolution system for use in an array scientific data processing system wherein the arrays are single elements in width and n elements in length and are referred to herein as vectors.

It is a further object of the invention to provide a conflict detection and resolution system for use in a vector data processing system wherein multiple vectors are concurrently processed by multiple pipelines.

It is also an object of the invention to provide a conflict detection and resolution system for use in a pipelined vector data processing system wherein the conflict detection portion detects potential memory access conflicts between the multiple pipelines prior to their occurence.

It is a further object of this invention to provide a conflict detection and resolution system for use in a pipelined vector processor wherein the resolution portion of the conflict system resolves potential memory access conflicts between pipelines by delaying memory access of the pipeline whose memory request requires the results obtained by the conflicting pipeline.

It is also an object of this invention to provide a conflict detection and resolution system for use in a pipelined vector processor wherein the conflict resolution portion of the conflict system resolves potential memory access conflicts between pipelines by delaying the memory access of the selected pipeline for the necessary period of time in equal time increments.

It is a further object of this invention to provide a conflict detection and resolution system for use in a pipelined vector processor wherein the system is capable of increasing the instruction rate by allowing overlapped execution of the instructions in the various pipelines.

It is a further object of this invention to provide a conflict detection and resolution system for use in a pipelined vector processor which processor, by concurrent execution of multiple instructions in multiple pipelines, allows instruction execution overlap.

B. Summary of the Invention

A conflict detection and resolution system for use in a pipelined vector processor is disclosed. Each of a multiplicity of pipelines concurrently executes different logical processes under the direction of different instructions in the pipelined processor. As would be expected in such a system, there are often cases where more than one of the multiple pipelines simultaneously requests a memory access. Such simultaneous memory access requests are called conflicts. Further, to properly resolve these conflicts, they must be granted access in a predetermined order. That is, for example, where the request of pipeline x needs the result provided by pipeline y. This information must be available to the resolution portion of the conflict system so that it may be considered at the time of the resolution. Means are provided by this invention for not only recognising that a conflict exists but, in addition, that a conflict will happen in the future. In addition, means are included for determining the particular type of conflict that will happen.

For example, at least three types of conflict can be handled. First, a conflict occurs where there is an attempt to read a result vector element of an earlier instruction before the result vector element is written. This is referred to as a Write/Read Conflict. The second category occurs when there is an attempt to overwrite a source vector element of an earlier instruction before it has been read. This is called a Read/Write conflict. Finally, the third category occurs where there is an attempt to overwrite a result vector element of an earlier instruction before it is written. This third conflict category is called a Write/Write conflict.

Basically a typical conflict detection and resolution mechanism basically comprises a first and a second pair of counter registers, each pair of which operates in conjunction with a separate comparator. Since there are two pairs of counter registers, there are two comparators. In addition, there is a pipe activity snapshot register which when initiated, captures the activity state of the other pipelines. The output signals from the two comparators are AND'ed together with the output of the pipe activity snapshot register to provide a detected conflict signal. Once a conflict signal is detected, a delay circuit is engaged to delay action by the conflicting pipe until the proper information is available to be written or read. This delay is accomplished by holding back the subsequent instruction by a given number of clock cycles.

BRIEF DESCRIPTION OF THE DRAWINGS

The following objects and the above summary will be more readily understood when read in conjunction with the accompanying drawings in which:

FIG. 6 is a block diagram of the Clock Distribution system used in the SP;

FIG. 7 is a timing diagram of the Clock Phases of the Clock Distribution System;

FIG. 8 is a simplified pictorial diagram of the Scalar Processor Module (SPM) of the SP;

FIG. 9 is a simplified pictorial diagram of the Vector Processor Module (VPM) of the SP;

FIG. 17 is a pair of tables respectively showing a first and a second rank of main chain Write/Read conflict detectors illustrating a total of 46 detectors used for this feature;

FIG. 18 is also a chart illustrating the total of 43 detectors used to accomplish the Read/Write detection operation.

FIG. 19 presents a group of three comparator silicon chip circuit charts illustrating the detection of possible Read/Write conflicts, Write/Write conflicts and Write/Read conflicts;

FIG. 20 shows a pair of comparator silicon chip circuit charts illustrating the detection Write/Write conflicts and a table showing the total number of detection circuits required;

FIGS. 21, 21A and 21B illustrate the block diagram of the Vector File conflict detector;

FIGS. 23, 23A and 23B illustrate the format of the Vector Control word;

FIG. 24 pictorially represents an example decode of a program instruction to the Vector Control word;

FIG. 25 is a timing sequence for the issuance and start-up of a VV format add instruction.

FIGS. 26, 26A and 26B are a logical diagram of the comparator circuit used in the conflict detection circuit of FIG. 16;

FIG. 27 is a truth table for equal and greater than equal compare networks;

FIG. 28 is a logical block diagram of a gate array showing a six bit counter such as would be used in the conflict detection mechanism of FIG. 16;

FIG. 29 is a table illustrating the truth functions of the six bit counter of FIG. 28.

Figure 1:
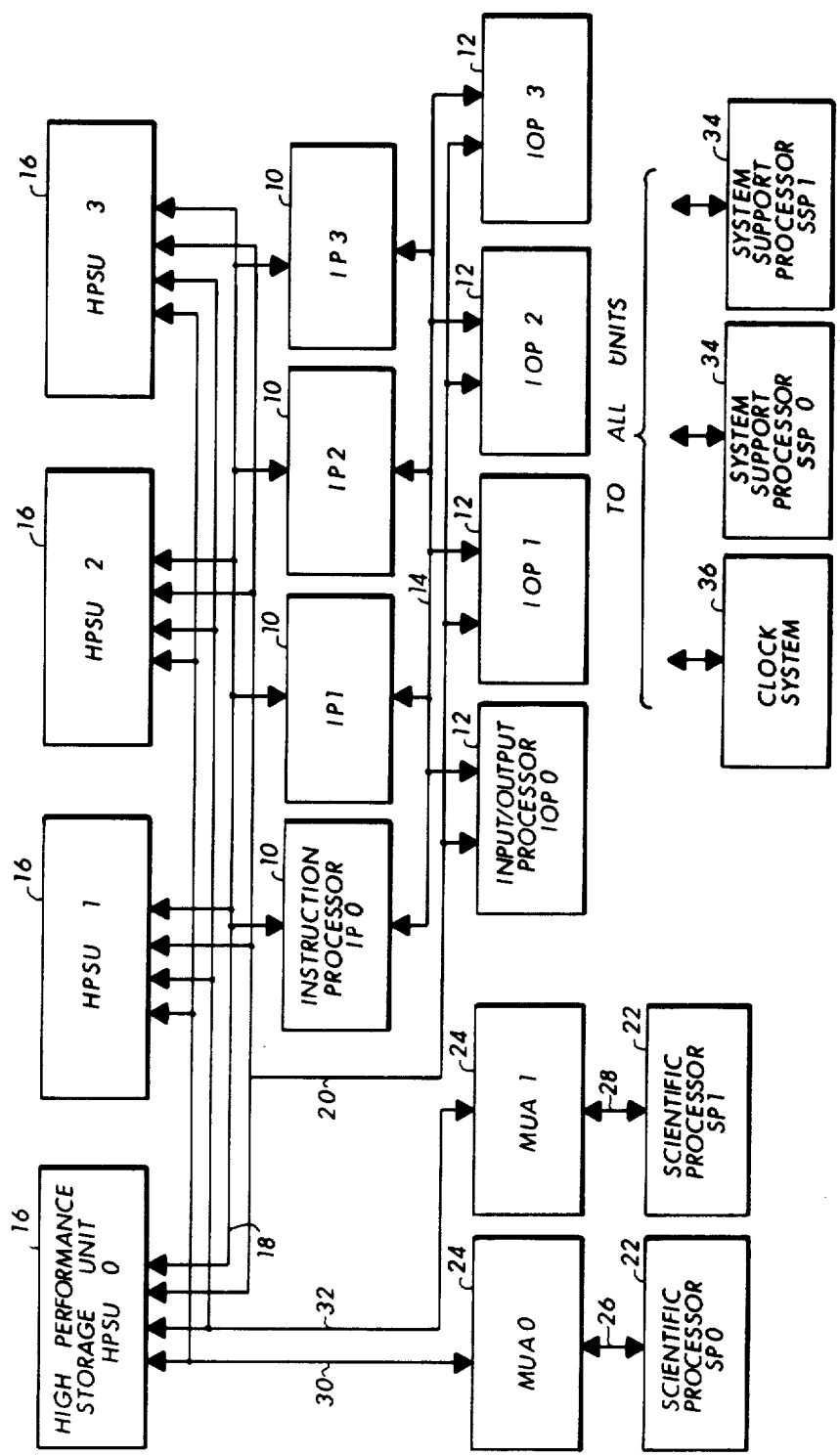
FIG. 1 is a system block diagram of the over-all digital data processing system in which the invention can be utilized.

| GLOSSARY | |
|---|---|
| TERM | DEFINITION |
| ACCEL | ACCELERATE |
| ADD | ADDEND |
| ADRS | ADDRESS |
| AG | ADDRESS TRANSLATION AND GENERATION SECTION |
| AI | ATTENTION INTERRUPT |
| ALT1 | FIRST ALTERNATE ELEMENT COUNT |
| ALT2 | SECOND ALTERNATE ELEMENT COUNT |
| ALU | ARITHMETIC LOGIC UNIT |
| AP | ADD PIPELINE SECTION (ALU) |
| ARM | AVAILABILITY, RELIABILITY, MAINTAINABILITY |
| AST | ACTIVITY SEGMENT TABLE |
| AUG | AUGEND |
| BFR | BUFFER |
| BNA | BANK NOT AVAILABLE |
| BPA | BOARD-PAIR ASSEMBLY |
| BRKPT | BREAKPOINT |
| BUF | BUFFER |
| BVL | BEGIN VECTOR LOOP |
| CB | CONTROL BLOCK SECTION |
| CAM | CONTENT ADDRESSABLE MEMORY |
| CELP | CURRENT ELEMENT LOOP POINTER |
| CBS | CB MEMORY SHADOW REGISTER |
| CLK | CLOCK |
| CLR | CLEAR |
| COMPR | COMPARE |
| CNT | COUNT |
| CONSIM | CONCURRENT FAULT SIMULATOR |
| CP | CHARACTERISTIC PIPELINE |
| CPG | CLOCK PULSE GENERATOR |
| CTRL | CONTROL |
| CVLP | CURRENT VECTOR LOOP POINTER |
| DBL | DOUBLE |
| DEC | DECELERATE |
| DES | DESIGNATOR |
| DEST | DESTINATION |
| DIAG | DIAGNOSE INSTRUCTION |
| DP | DOUBLE PRECISION |
| DP-FLP | DOUBLE PRECISION FLOATING POINT |
| DP-FXP | DOUBLE PRECISION FIXED POINT |
| EDC | ERROR DATA CAPTURE |
| EI | EXTERNAL INTERRUPT |
| EIF | EXECUTE IMMEDIATE FUNCTION |
| EL | ELEMENT LOOP |
| ELCNT | ELEMENT COUNT |
| ELPT | ELEMENT POINTER |
| EM | EXTERNAL MONITOR INTERFACE SECTION |
| EN | ENABLE |
| FDD | FIELD |
| FLP | FLOATING POINT |
| FXP | FIXED POINT |
| G | G REGISTER |
| GA | GATE ARRAY |
| GIV | GENERATE INDEX VECTOR |
| GOP | G OPERAND |
| HPP | HIGH PERFORMANCE PACKAGING TECHNOLOGY |
| HPSU | HIGH PERFORMANCE STORAGE UNIT |
| IA | INSTRUCTION ADDRESS |
| IDX | INDEX |
| IF | INSTRUCTION FLOW SECTION (CONSISTS OF IFA, IFB, & IFC) |
| IFA | INSTRUCTION FLOW ADDRESSING |
| IFB | INSTRUCTION FLOW BUFFER |
| IFC | INSTRUCTION FLOW CONTROL |
| IIH | INTERFACE INTERRUPT HANDLING |
| INTFC | INTERFACE |
| INTRP | INTERRUPT |
| INVLD | INVALIDATE |
| INTIN | INTERRUPTING INSTRUCTION |
| IP | INSTRUCTION PROCESSOR |
| IOP | INPUT/OUTPUT PROCESSOR |
| IPL | INITAL PROGRAM LOAD |
| IPCU | INSTRUCTION PROCESSOR COOLING UNIT |
| IUCT | IN UNIT CARD TEST |
| LSB | LEAST SIGNIFICANT BIT ($2^{35}$ IN 36 BIT WORD) |
| JHF | JUMP HISTORY FILE |
| LC | LOOP CONTROL SECTION (VECTOR LOOP & EL LOOP REG.) |
| LCS | LOOP CONTROL STACK |
| LD | LOAD |
| LS | LOCAL STORAGE (4K RAM IN LOCAL STORE |
| LSI | LARGE SCALE INTEGRATED CIRCUITS |
| LSS | LOCAL STORAGE STACK SECTION) |
| LSSA | LOCAL STORAGE SEGMENT ADDRESS |
| MCI | MAINTENANCE AND CONTROL INTERFACE |
| MEC | MAXIMUM ELEMENT COUNT |
| MFLOPS | MILLION FLOATING POINT OPERATIONS PER SECOND |
| MK | MASK PROCESSOR SECTION |
| MP | MULTIPLY PIPELINE |
| MPS | MULTIPLY PIPELINE SECTION |
| MPCD | MULTIPLICAND |
| MPI | MULTIPLE PASS INSTRUCTION |
| MRDNG | MOVE REGISTER DATA-NOT A G REGISTER |
| MSB | MOST SIGNIFICANT BIT ($2^0$ IN 36 BIT WORD) |
| MUA | MULTIPLE UNIT ADAPTER |
| MULTR | MULTIPLIER |
| MUX | MULTIPLEXER |
| MV | MOVE PIPELINE SECTION |
| MZ | MAXIMUM STRIP SIZE |
| NELCNT | NEXT ELEMENT COUNT |
| NLJ | NON-LOCAL JUMP |
| NOVLP INST | NONOVERLAPPED INSTRUCTION |
| OLM | ONLINE MAINTENANCE |
| PAR | PROGRAM ADDRESS REGISTER (ADDRESS OF NEXT INSTRUCTION) |
| PT | POINTER |
| PCC | POWER COUPLING CONTROL |
| RAM | RANDUM ACCESS MEMORY |
| RDY | READY |
| REG | REGISTER |
| RR | REGISTER-TO-REGISTER INSTRUCTION FORMAT |
| RSLT | RESULT |
| RS | REGISTER-TO-STORAGE INSTRUCTION FORMAT |
| SAEV | STORE ALTERNATE ELEMENT |
| ST | STORE BUFFER SECTION |
| SC | SCALAR/VECTOR DATA TRANSFER CONTROL SECTION |
| SCC | SCALAR CONDITION CODE |
| SCG | SINGLE CONDITION GENERATE |
| SCU | SYSTEM CLOCK UNIT |

-continued

GLOSSARY

| TERM | DEFINITION |
|---|---|
| SCS | SCALAR LOCAL STORE |
| SEDC | SCANSET ERROR DATA CAPTURE |
| SEL | SELECT |
| SI | STORAGE INTERFACE |
| SIMD | SINGLE INSTRUCTION MULTIPLE DATA |
| SLR | STORE LOOP CONTROL REGISTER |
| SP | SCIENTIFIC PROCESSOR |
| SP ALU | SCALAR PROCESSOR ARITHMETIC LOGIC SECTION |
| SP-FLP | SINGLE PRECISION FLOATING POINT |
| SP-FP | SINGLE PRECISION FIXED POINT |
| SPCB | SCIENTIFIC PROCESSOR CONTROL BLOCK |
| SPM | SCALAR PROCESSOR MODULE |
| SPP | SYSTEM PROBE PANEL |
| SRC | SOURCE |
| SS | SCANSET SECTION |
| SSI | SMALL SCALE INTEGRATED CIRCUITS |
| SSP | SYSTEM SUPPORT PROCESSOR |
| ST | STORE BUFFER SECTION |
| SUNA | STORAGE UNIT NOT AVAILABLE |
| SV | STORE VECTOR |
| SVX | STORE VECTOR INDEXED |
| TC | TIMING CHAIN |
| TM | TRACKING MEMORY |
| TS | TIME SLOTS |
| UCM | UNIT CONTROL MODULE |
| UIA | UNIVERSAL INTERFACE ADAPTER |
| UP | UNIVERSAL PROCESSOR INTERFACE SECTION |
| UPI | UNIVERSAL PROCESSOR INTERFACE |
| USC | UNIT SUPPORT CONTROLLER |
| VC | VECTOR CONTROL SECTION |
| VCW | VECTOR CONTROL WORD |
| VF | VECTOR FILE |
| VL | VECTOR LOOP |
| VL | VECTOR LOAD |
| VOP | VECTOR OPERAND |
| VP | VECTOR PROCESSOR |
| VPM | VECTOR PROCESSOR MODULE |
| VPW | VECTOR PARAMETER WORD |
| VS | VECTOR STORE |
| VSO | VIRTUAL SEGMENT OFFSET |
| VS | VECTOR STORAGE SECTION |
| VV | VECTOR STORAGE INSTRUCTION FORMAT |
| WO | WORK CAPACITY |
| WR | WRITE |

DETAILED DESCRIPTION OF THE INVENTION

The following detailed description will be more easily comprehended when it is read in conjunction with the accompanying drawings in which like reference characters symbolize corresponding parts.

A. Conventions

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will be satisfied only when all input lines receive High signals.

In a similar manner, if an A symbol is illustrated having two or more open-arrowhead inputs, the function designated is that of Low AND, and will be satisfied only when all inputs are Low. It is apparent that this Low AND function is logically equivalent of a High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various type of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND function and the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can, for example, be a Type 3054-00 unit available from Sperry Corporation, or such other Instruction Processor, available commercially, as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and, in general, does data manipulation. The IP also executes instructions to set up input and output data buffers and channel access control.

In conjunction with the IPs, from one to four Input/Output Processors IOP0 through IOP3, labelled 12, can be utilized. The interconnections between the IPs and the IOPs, collectively labelled 14, are, in fact, direct connections between each unit, and the interconnection is not bused. Each IOP can be a Type 3067-00 unit available from Sperry Corporation, or an equivalent type of processor. The IOPs handle all communications between the IPs, the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown there are two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified co-pending incorporated patent applications.

Error Correction Code (ECC) is used internally to each HPSU to provide single-bit error correction and double-bit error detection.

In the embodiment illustrated one or two Scientific Processors SP1 and SP2, labelled 22, can be utilized. If a single SP is used with a single HPSU, it may be coupled directly to the SP port of such HPSU. When two or more HPSUs are used with an SP, it is necesssary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and getting of information, the activation of most maintenance facilities, selecting modes of operation and the like, are all done at the control section of the SSP.

A Clock System 36 is utilized to maintain synchronous operation of the entire system. Clock and synchronizing signals are sent to each IP as well as to each HPSU, each IOP, and each SP. The clock interface includes signals and commands from the IP for controlling clock rates, clock mode, cycle count, and other capabilities of the clock. The clock system is novel, and is described in one of the above identified co-pending patent applications.

Intercommunication between units is essentially on a Request and Acknowledge basis, and the interfaces will be described in more detail as appropriate.

C. High Performance Storage Unit (HPSU)

Figure 2:
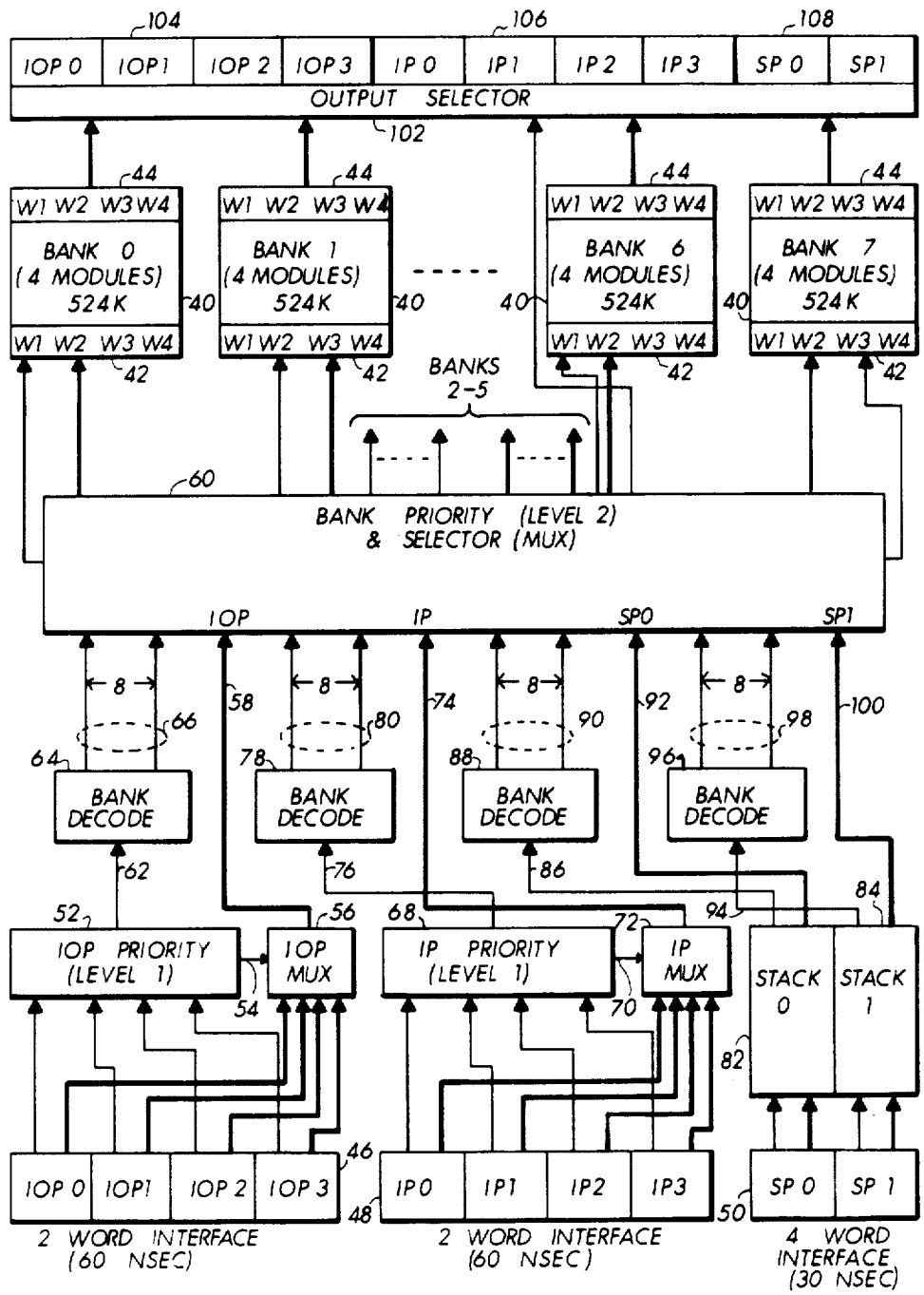
FIG. 2 is a simplified functional blocked diagram of the High Performance Storage Unit.

FIG. 2 is a simplified functional block diagram of the High Performance Storage Unit.

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IOP0 through IOP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 74 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 4. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector 60 functions to select between the IOP, IP, and the two SP requests presented to it for accessing memory. It also functions to control the Output Selector 102 when reading is to take place. The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports labelled SP0 and SP1. Data rates and timing at the output ports 104, 106, and 108 are similar to those for the input ports previously described.

D. Multiple Unit Adapter (MUA)

Figure 3:
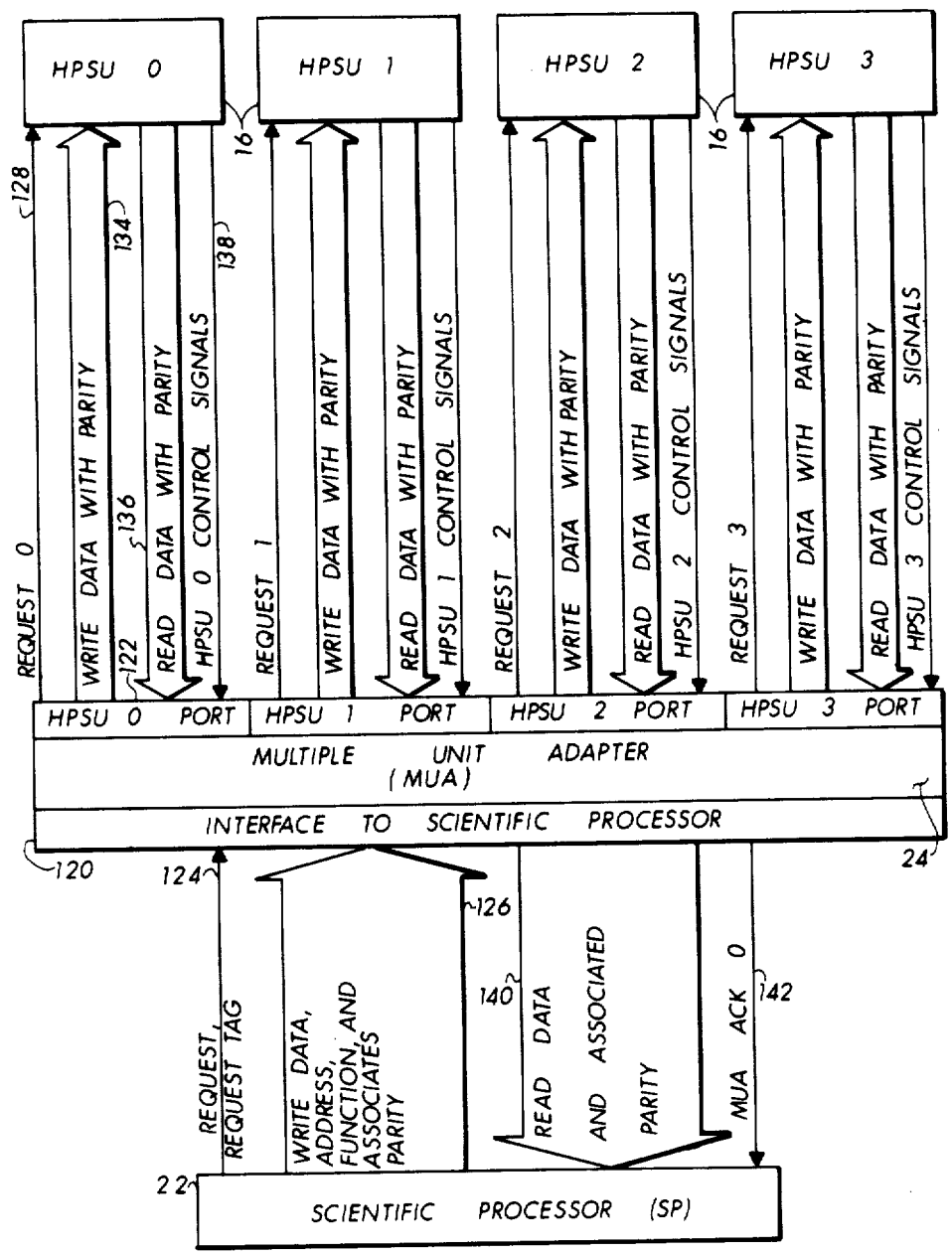
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPUS0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
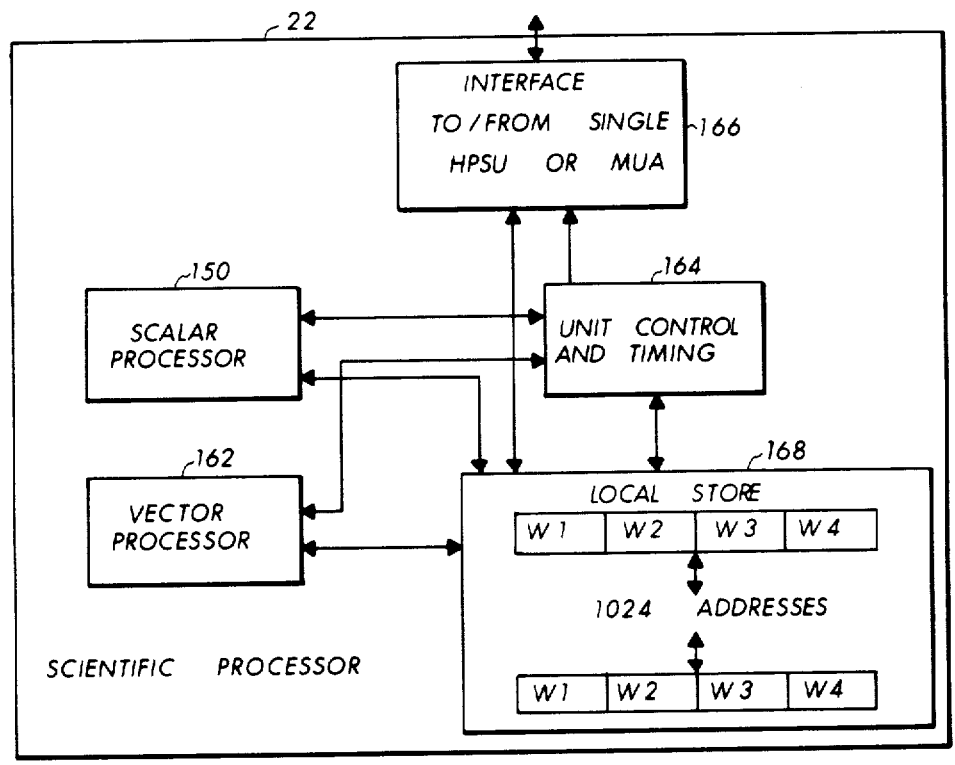
FIG. 4 is a simplified block diagram of the Scientific Processor.

FIG. 4 is a simplified block diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priviledged modes of operation. The SP includes distinct modules, the Scalar Processor 150, the Vector Processor 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs user programs that are set up in an HPSU by one of the IPs. Programs and portions of programs set up for execution on an SP are called activities.

In a minimum multiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address range within the HPSU are honored on a certain priority basis and in that case, some of the requesters must wait their turn.

The System Clock Unit (Clock System 36) provides logic clock signals to the HPSU, the SP, the IP and the IOP. Each System Support Processor (SSP) 34 has its own clock source (not shown). The SSP is directly connected to the HPSU, the IOP, the IP and to the SP. It is also indirectly connected to the System Clock Unit 36 and to the Instruction Processor Cooling Units (not shown).

Figure 5:
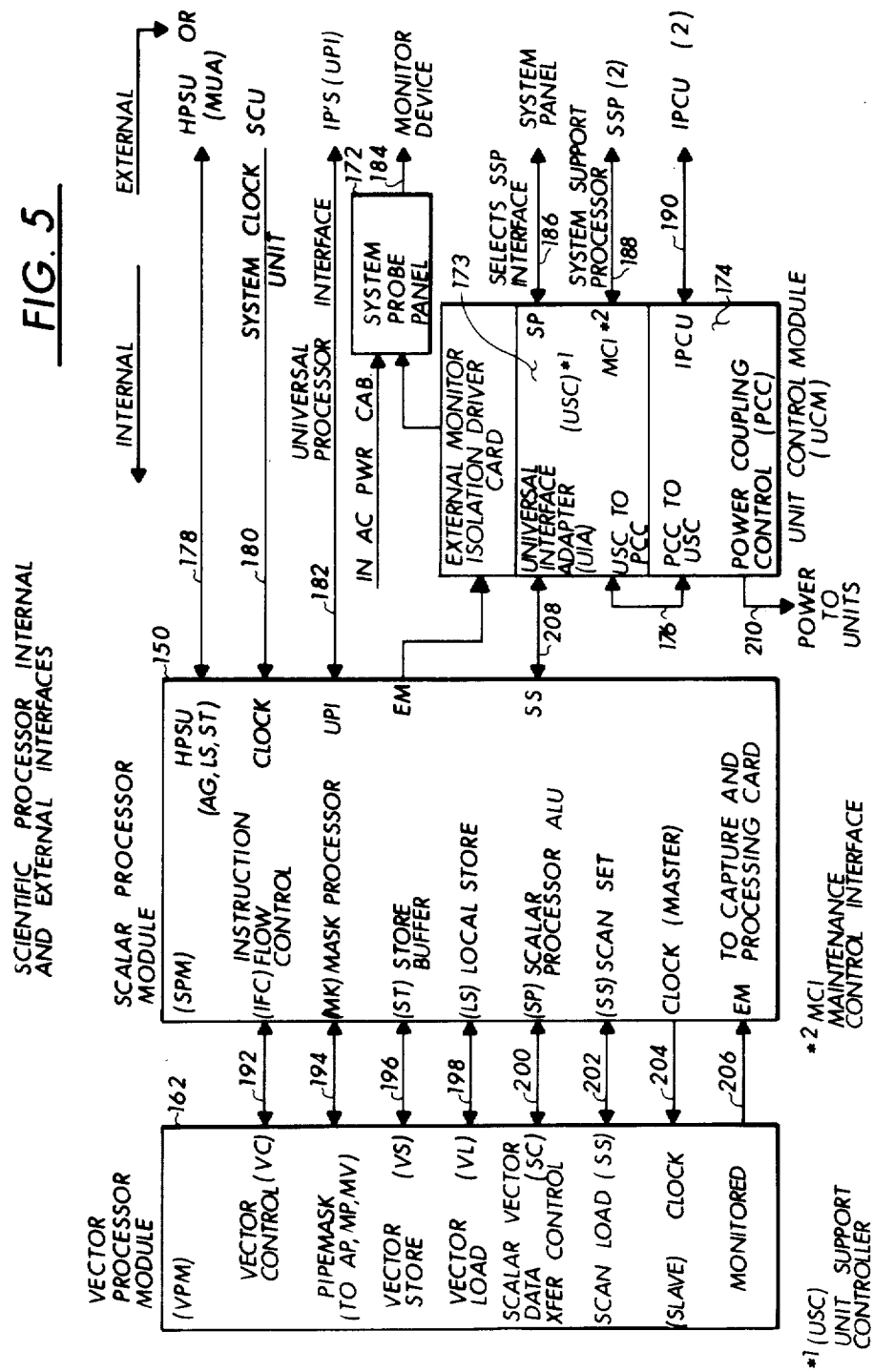
FIG. 5 is a block diagram of the Scientific Vector Processor (SP) Internal and External Interfaces.
Figure 10B:
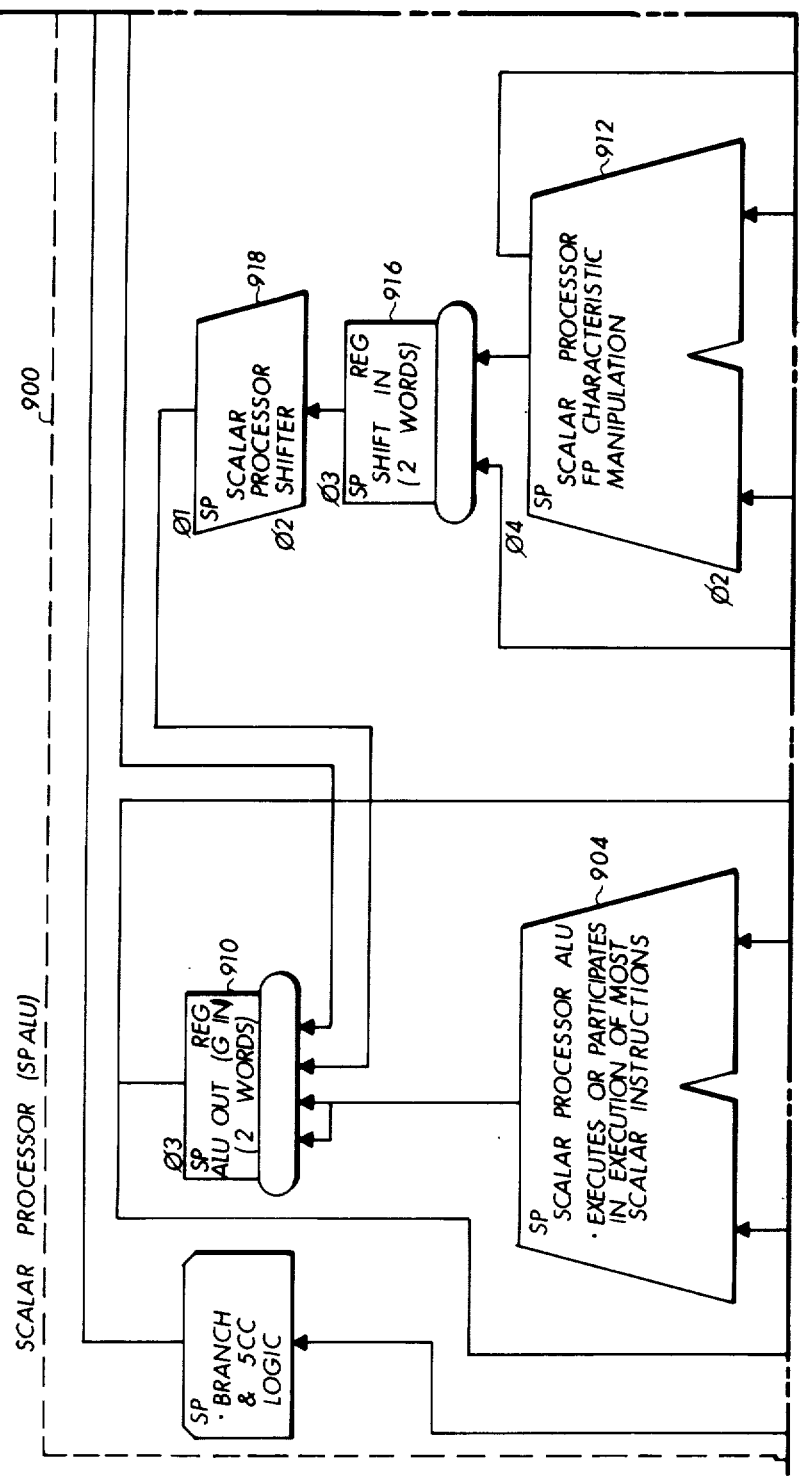
FIG. 10 includes FIGS. 10A, 10B, 10C, 10D 10E, 10F, 10G, 10H and 10I positioned as shown and represents a more detailed block diagram of the Scalar Processor Module (SPM) of the SP.
Figure 10C:
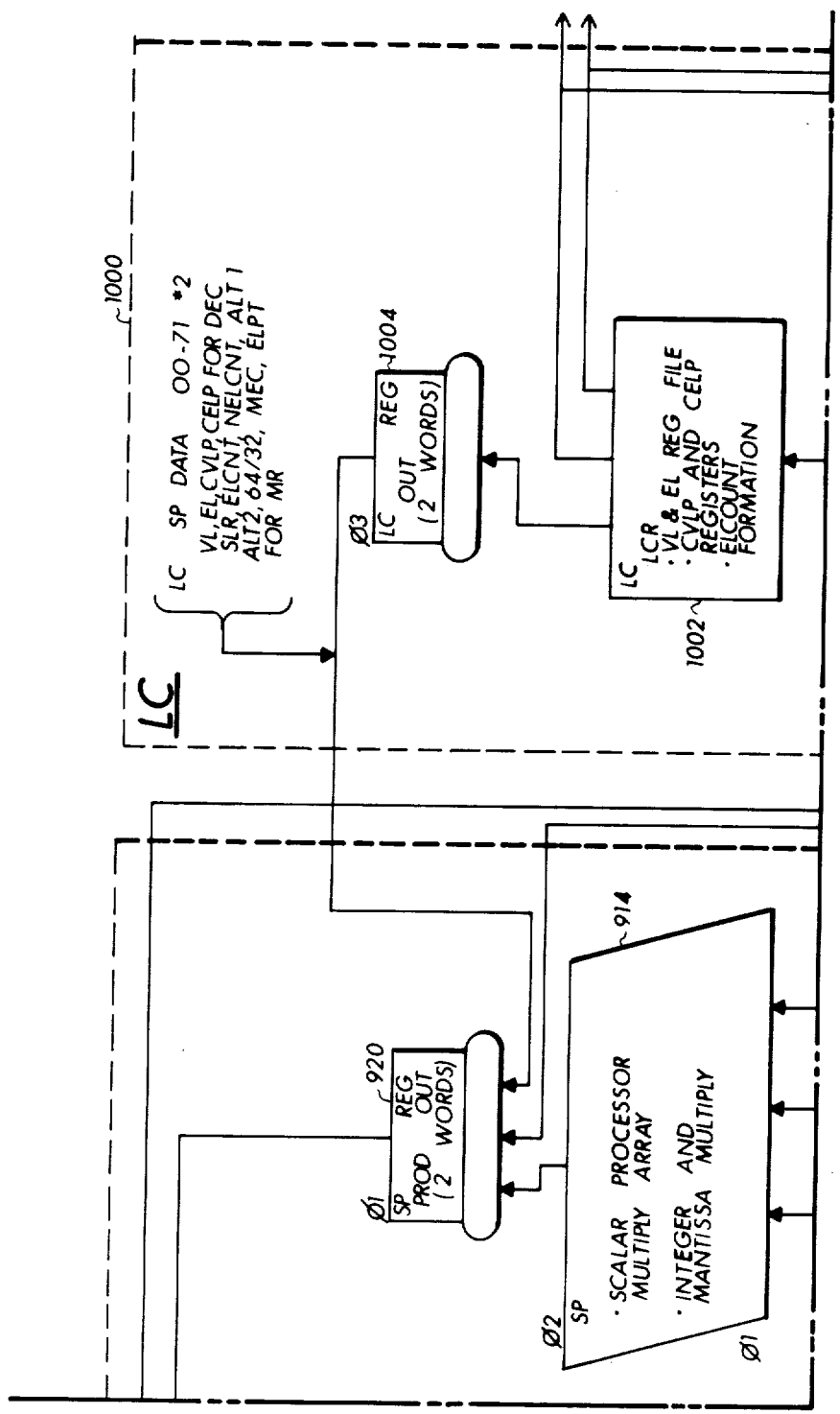
Figure 10F:
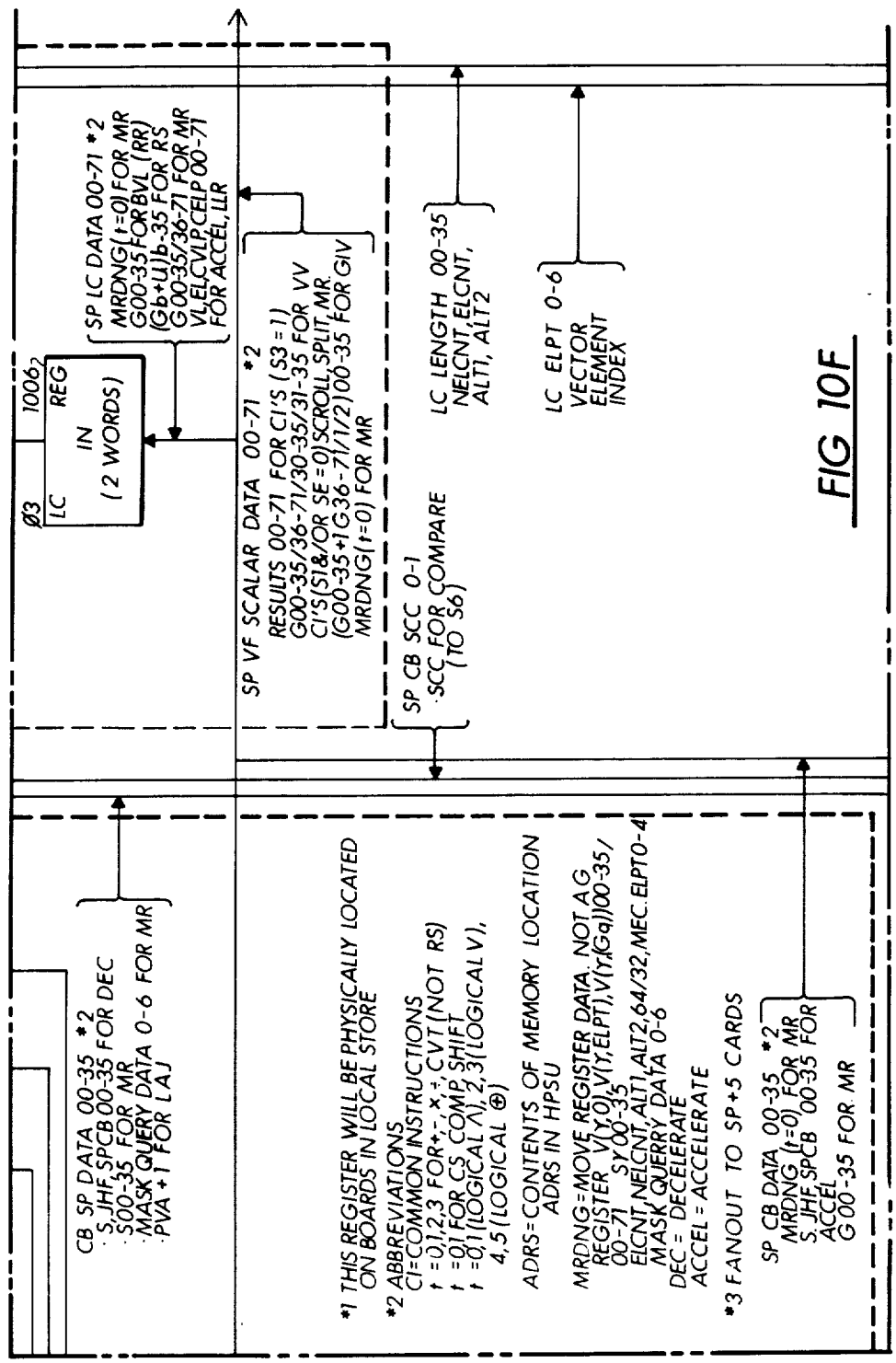
Figure 10H:
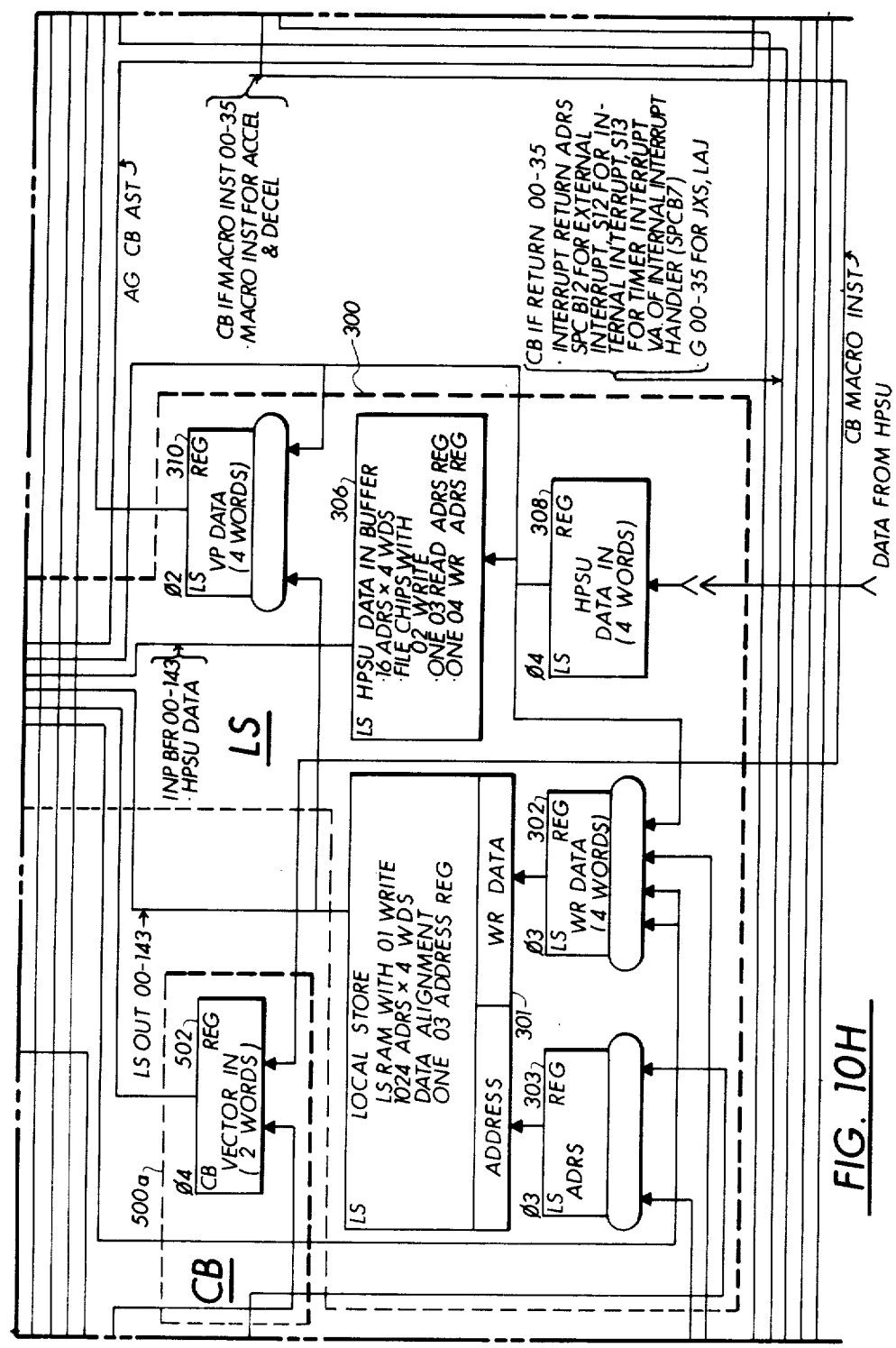
Figure 101:
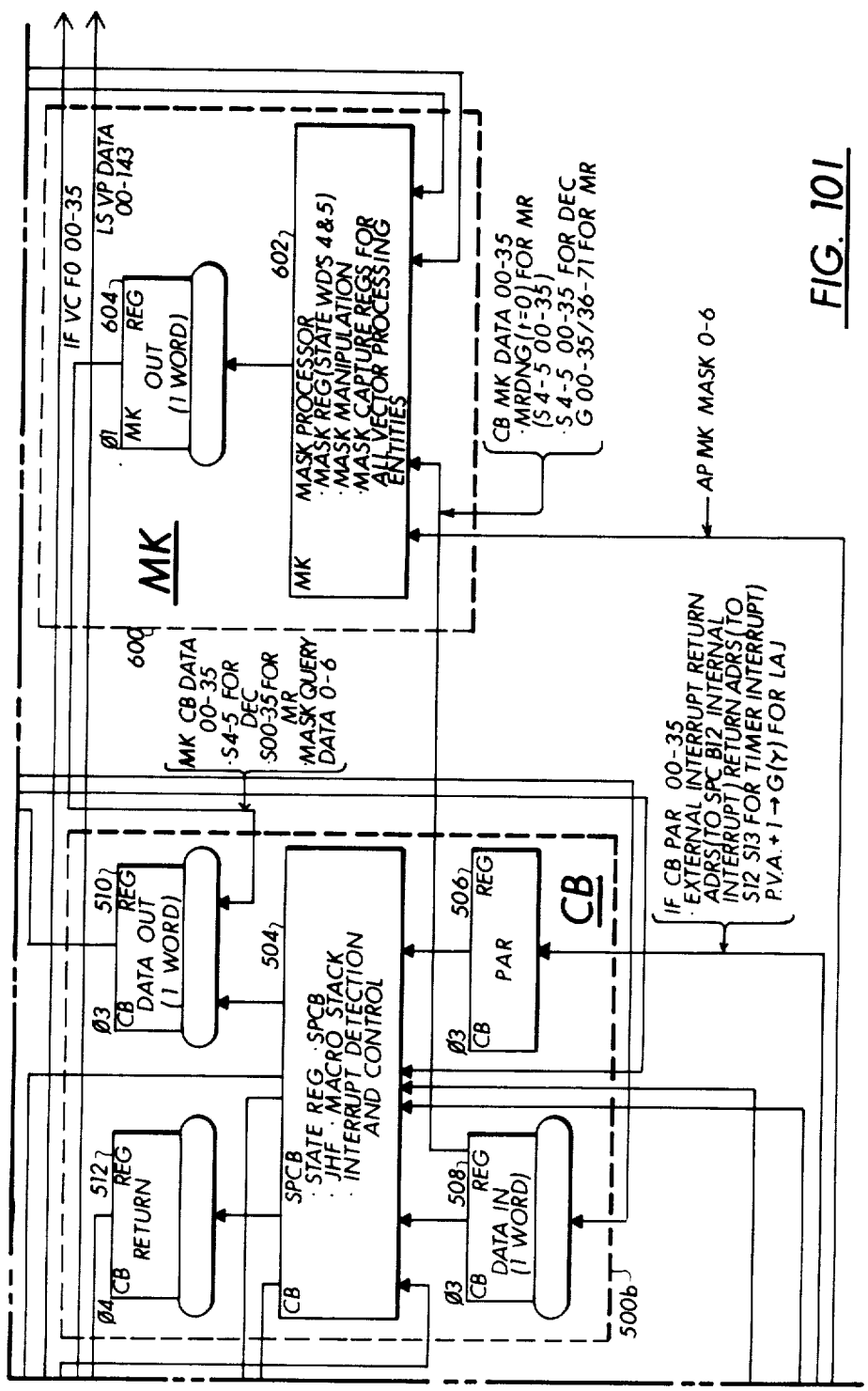

FIG. 5 is a block diagram of the Scientific Processor (SP) internal and external interfaces. In the Scientific Processor, which is designated as a Type 3068-0 unit available from Sperry Corporation, there are four internal units or modules, namely the Vector Processor Module (VPM) 162, the Scalar Processor Module (SPM) 150, the Unit Control Module (UCM) 170, and the System Probe Panel 172. The Unit Control Module 170 is further partitioned into two logical entities, the Unit Support Controller (USC) 173 and the Power Coupling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is via line 182. The interface from the System Probe Panel 172 to the monitoring device is via line 184. The input from the System Panel interfaces with the Unit Support Controller 173 of the Unit Control Module 170 via line 186. One of the things that this interface does is to select the next interface. There are two interfaces via line 188 to two different System Support Processors 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental conditions.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP) the Multiply Pipe, (MP), and the Move Pipe (MV) in the VPM. These will be described in detail below. The Vector Store (VS) interface 196 provides information stored in the Vector Files to the Store Buffer (ST) logic section of the SPM. From there data is transferred to the HPSU or the Local Store. The Vector Load (VL) interface 198 transfers data from the Local Store (LS) section to the Vector Load (VL), from where it is transferred into the Vector Files. The source of the data in this case is from the HPSU or from the Local Store. The Scalar Vector Data Transfer (SC) interface 200 transfers data from the SPM to the VPM. It also writes Scalar instruction results into the Vector Files or broadcasts G operands for Vector instructions. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 806. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit clock card 220 in the Scalar Processor Module. From there, clock signals are sent to the Slave unit clock card 222 in the Vector Processor Module. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock Unit, and utilize two Clock Pulse Generator (CPG) Gate Arrays (GA) on each card to derive the four phase clock signals identified as phases 1, 2, 3, and 4 (01, 02, 03, 04) for distribution on that logic card. In other words, each logic card has its associated CPG circuits.

FIG. 7 is a timing diagram of the Clock Phases. The clock phases illustrated occur at the output of the two Clock Pulse Generators on each logic card. The low portion of each clock pulse is the active level, i.e. the time that the signal is low is the period of the clock pulse that is considered its active time. Four clock pulse phases are generated. The times shown are common to all four phases. The clock cycle is 30 nanoseconds from start of one clock pulse in a phase to the start of the next occurring pulse in that phase. The clock pulses are nominally 5½ nanoseconds in duration. The time duration from the beginning of a clock signal in one clock phase to the beginning of a clock signal in the next subsequent clock phase is nominally 7½ nanoseconds.

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and a power dissipation of up to 5 watts. The SSI packages, or chips as they are called, have 21 logic pins and power dissipation of up to a quarter of a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A number of card pins are also reserved for logic changes, and modifications. In some instances power distribution pins on a card are the limiting factor for the necessary interconnections. The printed circuit cards are 11.3 inches wide by 10.8 inches deep, with logic, power, and ground connectors on three edges. Connectors on the rear edges of the cards plug into a back panel of the module through use of a conventional connector. The two side edges of the cards connect to the side panel to the module with Zero Insertion Force (ZIF) connectors. The cards are paired together and have two connectors for logic signals between the cards of the pair. These circuit packages are water cooled by a cold plate between the cards of the pair. Two cards and a cold plate are attached together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

FIG. 8 is a block diagram of the Scalar Processor Module (SPM) of the SP. FIG. 9 is a block diagram of the Vector Processor Module (VPM) of the SP. These two drawings taken together illustrate the machine organization at the block diagram level. First, as to the block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a character identifier. This identifier is also used as a prefix for all logic signals originating in that section. In the SPM (FIG. 8), break out to the eight logic sections is on a functional basis. These sections provide architectually, the required functions. In the VPM (FIG. 9) design of sections was done to accommodate parallel pipelined operation for higher performance.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000. These sections will be described in detail below.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (AUU); the Multiply Pipeline (MP) section 1700; and the Move Pipeline (MV) section 1800. A special control section Conflict Detection and Resolution 1900 is utilized to resolve conflicts between the various pipelined sections and this application is directed to this special control section, 1900. A detailed description of this Conflict Detection and Resolution system, 1900 will now be undertaken.

5. Scalar Processor

Figure 11H:
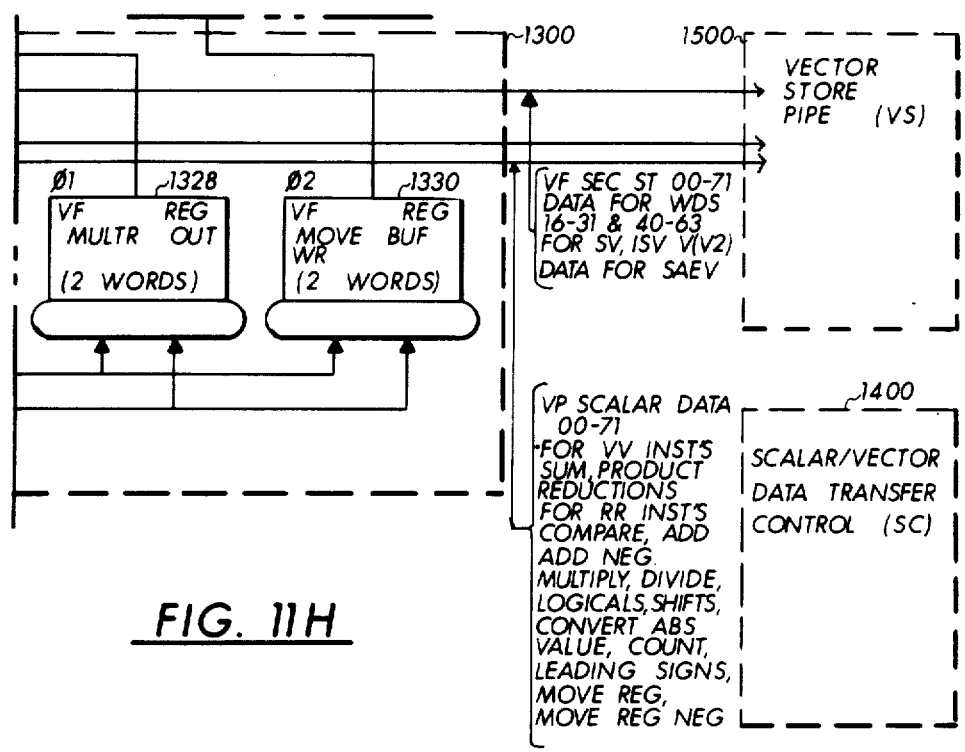
FIG. 11 includes FIGS. 11A, 11B, 11C, 11D, 11E, 11F, 11G and 11H positioned as shown and represents a more detailed block diagram of the Vector Processor Module (VPM) of the SP.
Figure 11:
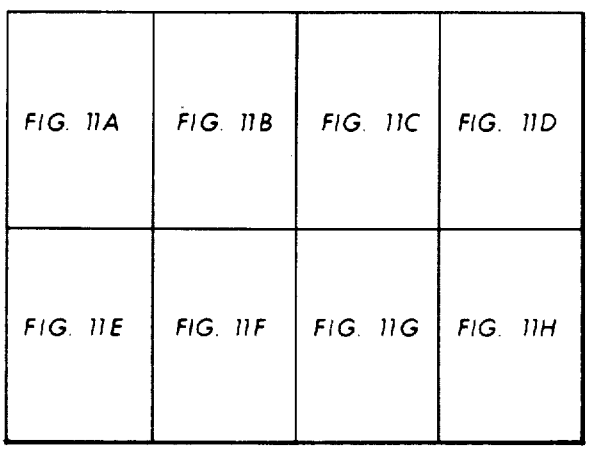
Figure 11A:
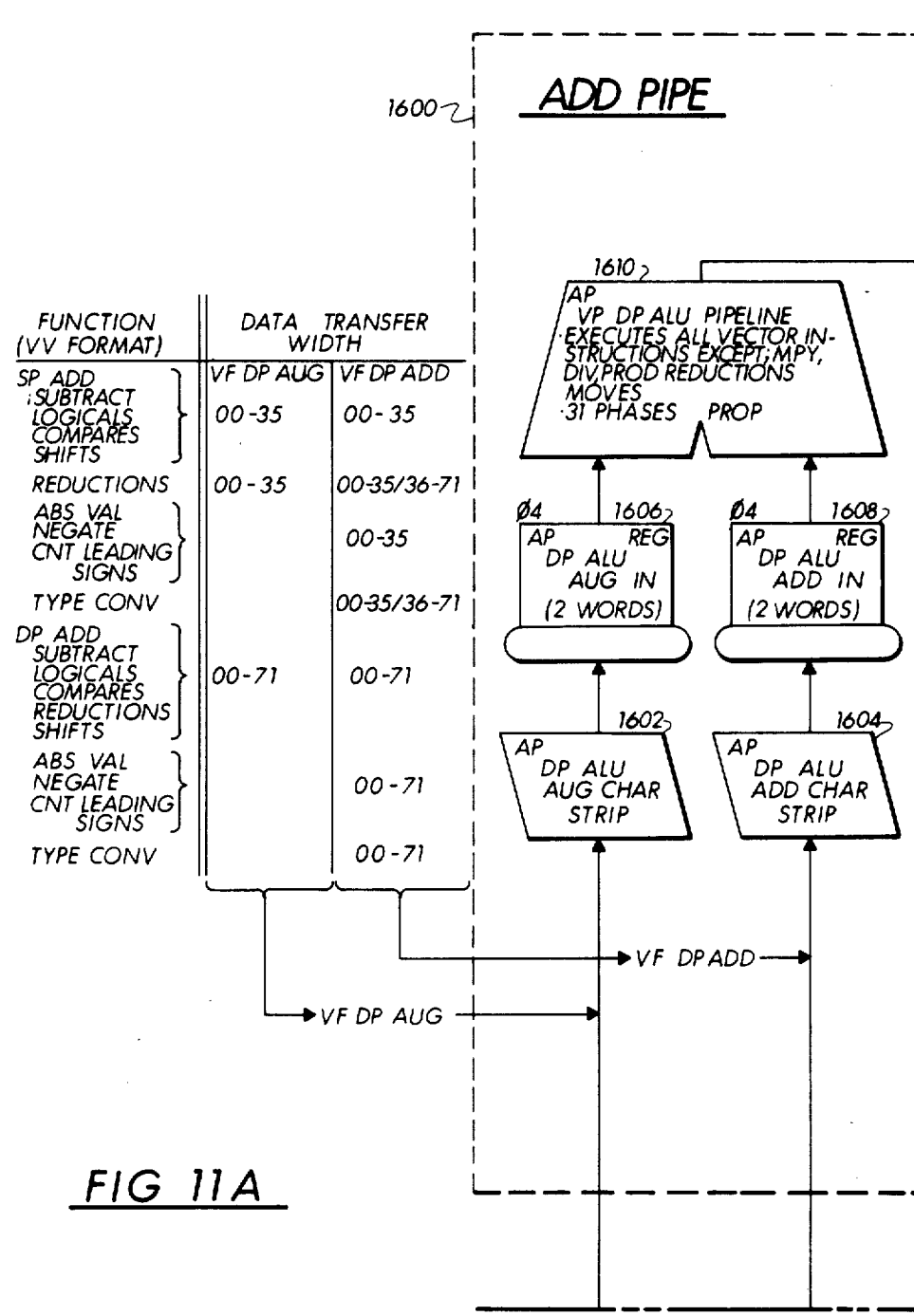
Figure 11B:
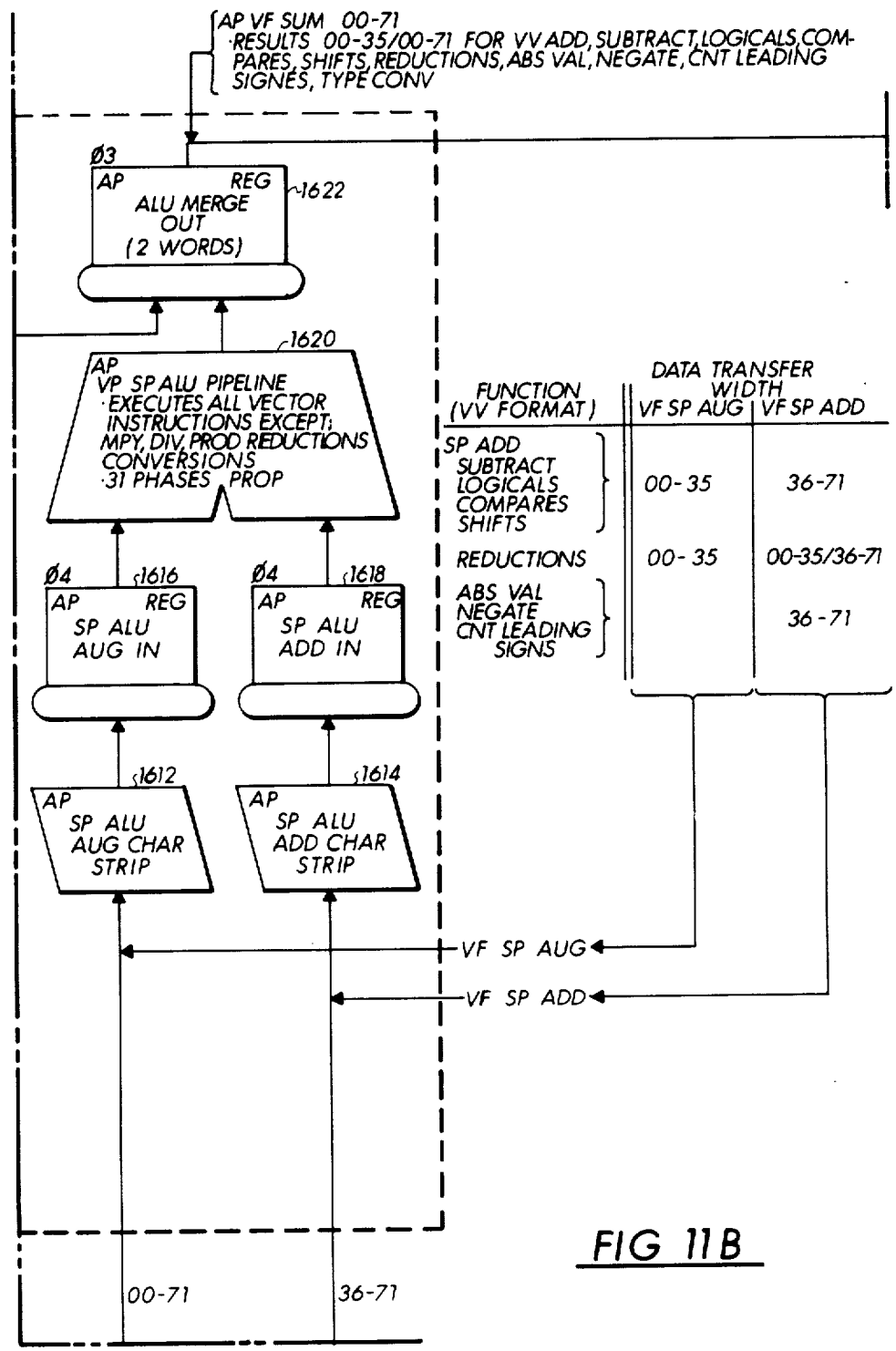
Figure 11C:
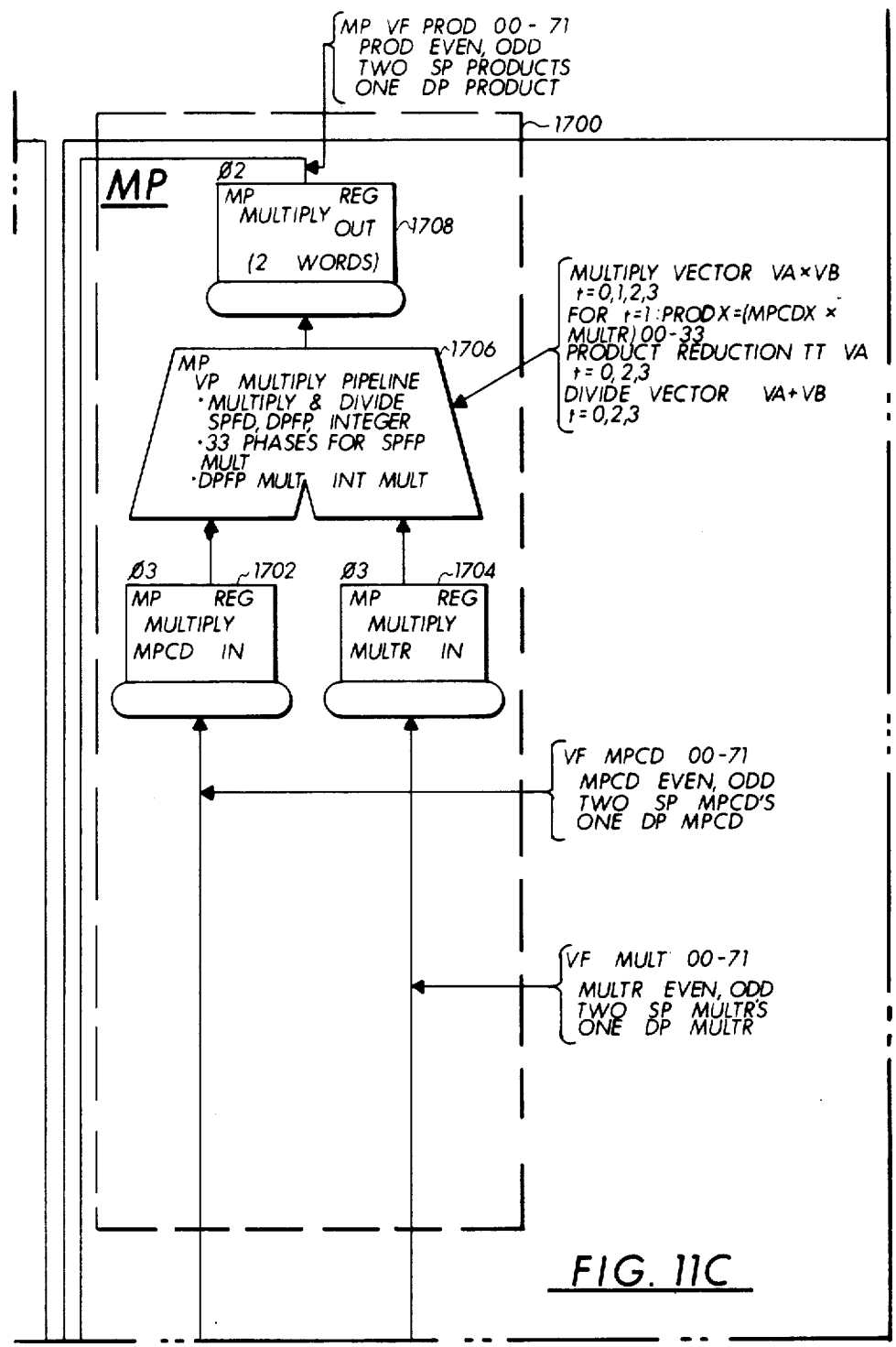
Figure 11D:
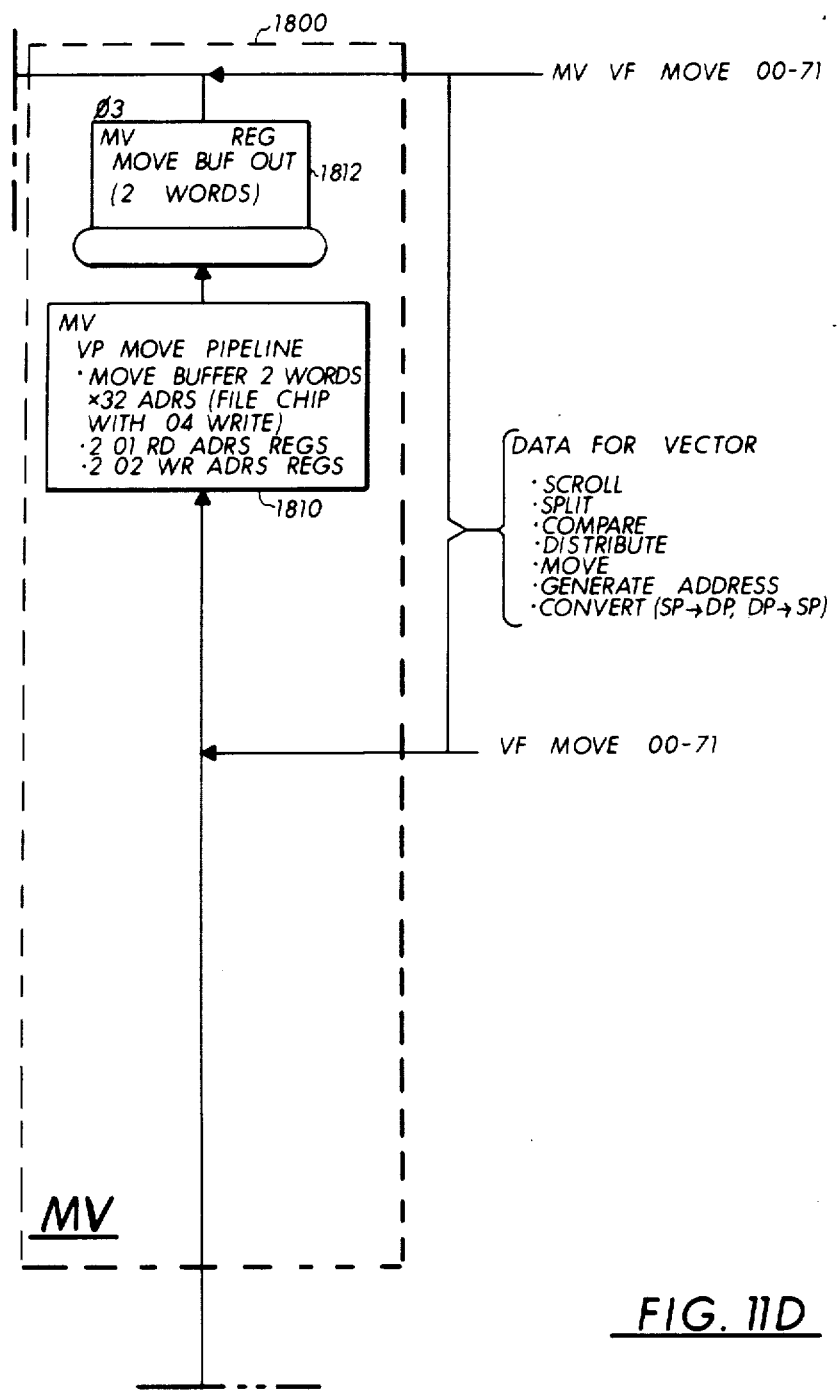
Figure 11E:
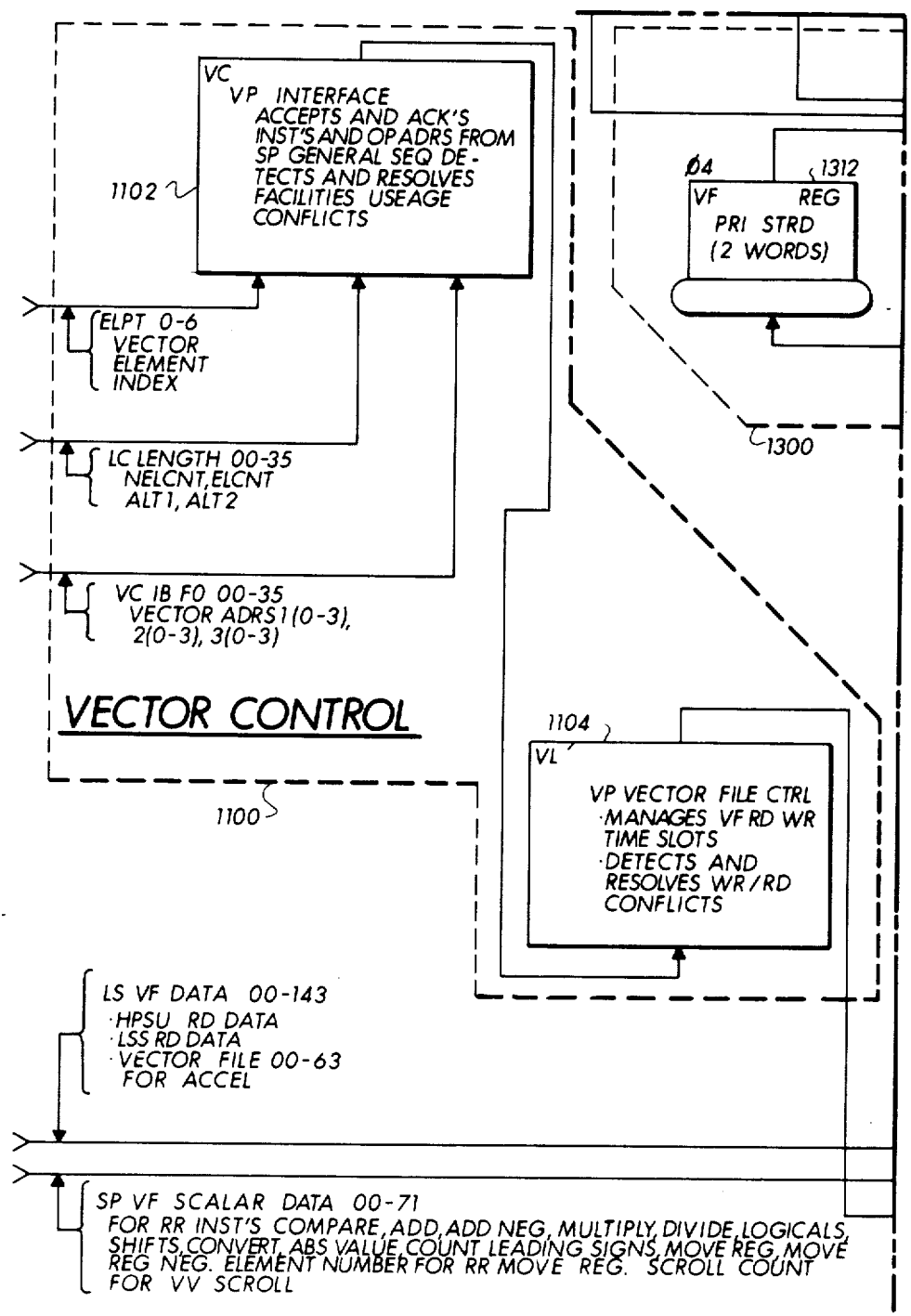
Figure 11F:
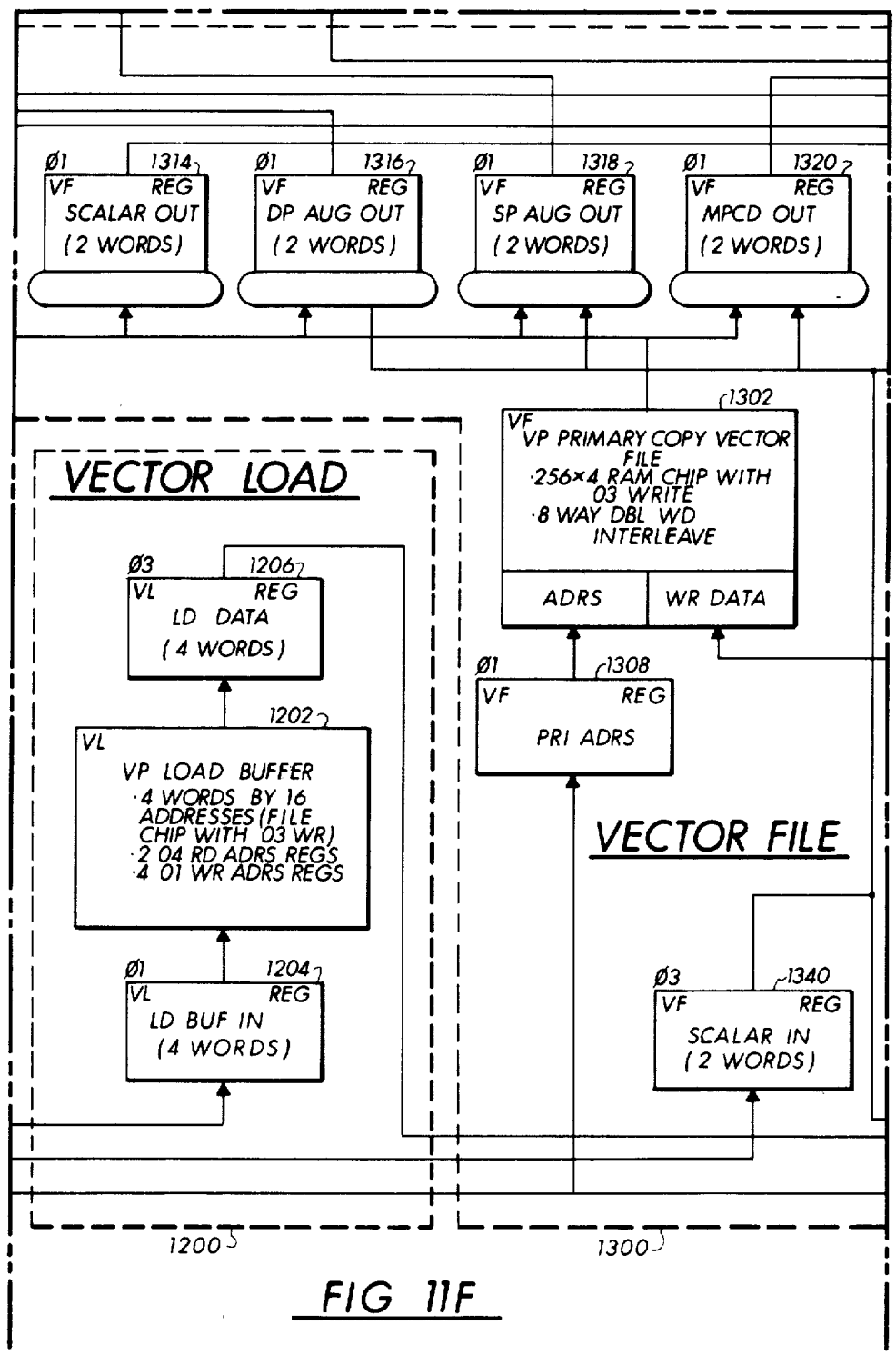
Figure 11G:
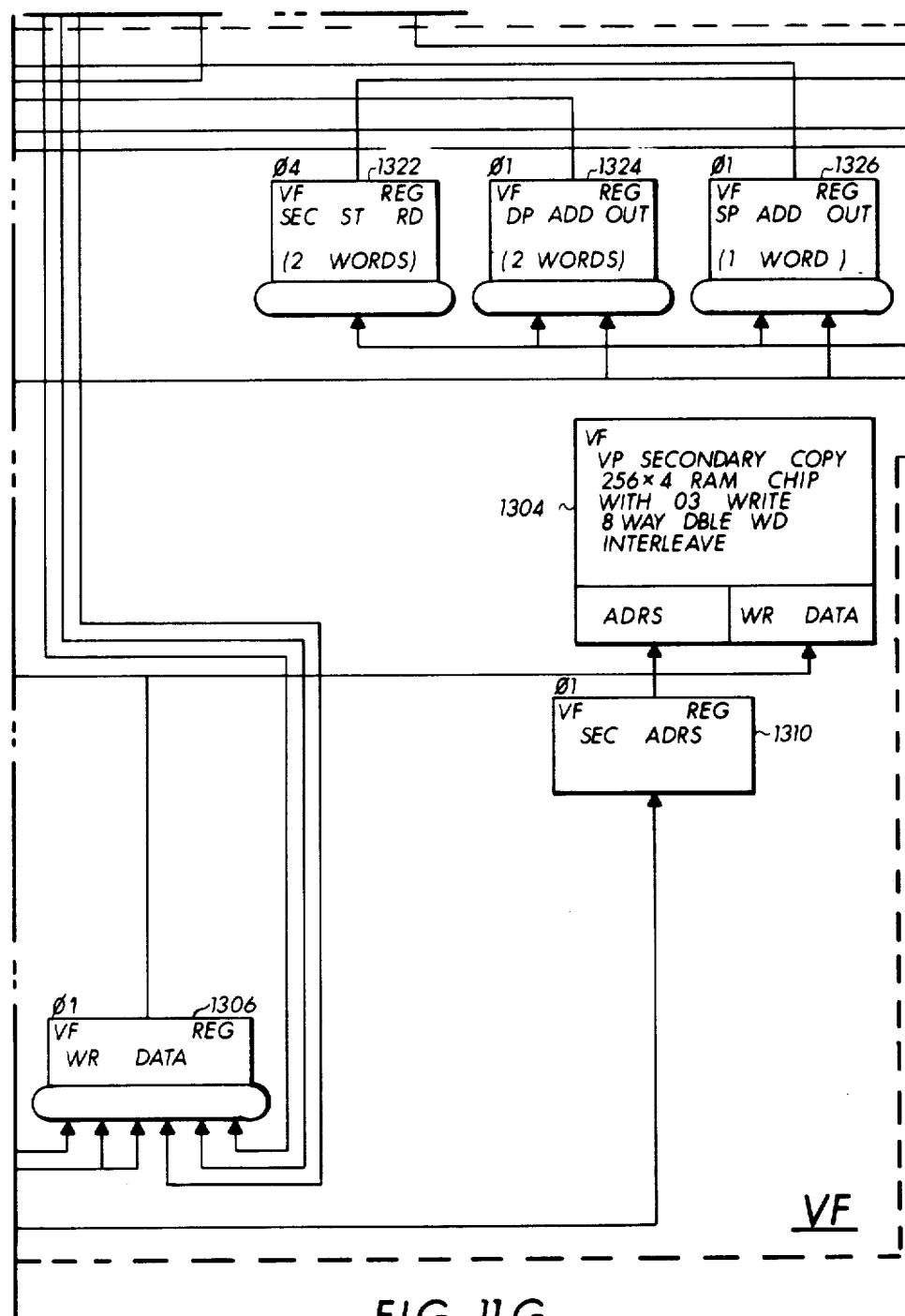

To accomplish this, we will first present more detailed block diagrams of the SPM and the VPM. The SPM is illustrated in detail in FIG. 10 and includes FIGS. 10A through 10E arranged as shown while the VPM is shown in more detail in FIG. 11 and includes FIGS. 11A through 11I arranged as shown. A more detailed discussion of these figures is presented in a co-pending parent application entitled "A SCIENTIFIC PROCESSOR" by Louis B. Bushard, Larry L. Byers, James R. Hamstra, Charles H. Homan, Archie E. Lahti, and John T. Rusterholz; Ser. No. 761,201 and that description is incorporated herein by this reference.

LOGICAL USAGE CONFLICT DETECTION AND RESOLUTION

It has been previously discussed that there are four functions which the Vector Control section performs. Its first function is to receive and acknowledge the reading of the instruction from the various pipes.

Next, there was a discussion of the Vector File time slot management function. Further, there has been a discussion of the Vector File address selection. The fourth function that the Vector Control performs is to detect logic usage conflicts. The Vector File logic usage conflicts are caused by the fact that there is an overlapping of instructions and by the asynchronism of operations between the various sections of the logic and the system. Several sources or reasons for this asynchronism exist. The most important reason is that in a multiprocessor envirnment there is a contention for access to the High Performance Storage Units (HPSU). The host processors (IP's) and the Input/Output Processors (IOP's), for example, make simultaneous requests and references to the same HPSU storage unit.

Another source of asynchronism is the fact that the Scalar Processor section of the Scalar Processor Module has various execution times for different instructions. Similarly, this same problem occurs within the Vector Processor Module. For example, the Divide operation is accomplished by a multipass algorithm that produces results at a different time than the Add and the Multiply.

The asynchronism associated with the VPM occurs mainly at the various interfaces between the Scalar Processor Module and the Vector Processor Module. This asynchronism not only causes conflicts but also other design complexities between those sections and the interface with the Vector Load section, the Vector Store section and the Scalar Control section of the SPM.

There is another general category of conflicts called facility usage conflicts. An example would be where the instruction is held up at the Vector Control section, because the VF time slots are all assigned, even though the pipes are free to execute, and available to begin execution.

Moving to a second point, regarding asynchronous operation, the results produced by the machine must be as if each instruction is completely executed before starting the next instruction. Further they have to be executed in exactly the same order as specified by the program.

The next point under logical usage conflicts is conflict detection. This operation is used when an instruction is detected which is attempting, via a pipe, to use or alter the Vector File element, while some earlier instruction using another pipe is still using the Vector File. There are also other cases where the Add Pipe and the Multiply Pipe conflict with themselves.

The final point is conflict resolution. Basically this is done by one of the conflicting pipes waiting or freezing for 8 clock cycles at a time i.e. 8, 16, 24 clock cycles etc., until the conflict is resolved or cleared. The reason for this is that when a conflict on a word pair in a Vector File is encountered, it is necessary to pick up a result operation at exactly the same place and that operation occurs at an increment of 8 clock cycles.

First, we will consider the various types of conflicts that must be detected so that we will be able to recognize them.

Figure 12:
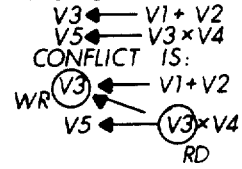
FIG. 12 is a pictorial diagram representing an example of a Write/Read conflict.

Basically, there are three types of conflicts that can occur. First is a Write/Read conflict as shown in FIG. 12. The way that this operation is written denotes first what is occurring at the earlier instruction and this is the operation that is suffering the conflict. In a Write/Read conflict, the write operation has not been completed before the contents are attempted to be read. The data that is to be altered by this earlier instruction has not been completed and this read operation must be delayed until such time as the writing actually takes place so that the conflict may be cleared.

Figure 13:
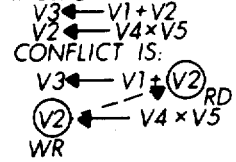
FIG. 13 is a similar diagram to FIG. 12 however representing an example of a Read/Write conflict.

The second conflict type is the Read/Write conflict shown in FIG. 13. This is where the earlier instruction is doing a read operation which for some reason has not been completed and some subsequent or following instruction is attempting to alter that data before the read operation has actually taken place. In this case, the second operation i.e. the write has to be delayed until such time as the read operation has been successfully completed.

Figure 14:
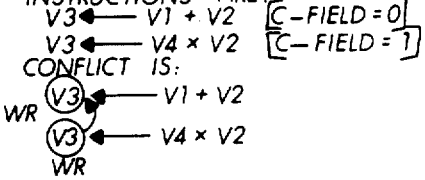
FIG. 14 is another diagram similar to FIGS. 12 and 13 representing an example of a Write/Write conflict.

The third conflict type is a Write/Write conflict and is shown in FIG. 14. In this case, some earlier instruction in the program is altering data in a Vector File and a subsequent instruction is attempting to alter the same data. Before the second write operation is allowed to occur, the first one must be completed. If not, the subsequent over writing will not take place. Note that a read/read operation is not a conflict since the data is not to be altered in the Vector File organization and the same element numbers of the same files may be read for various operations of the various pipes.

Next, consider each of these examples in detail. The first one shown in FIG. 12 is the Write/Read conflict and we will look at two instructions within a program. There are prior and subsequent instructions to these two instructions. Although not shown, consider that four Vector registers, V1, V2, V3 and V4, for example, are being utilized. The first instruction is a Vector Add which is going to take the elements of Vector File 1 and to them add the elements of Vector File 2 and then write the result of that addition into Vector File 3. The second instruction shown is a multiply instruction which, of course, is executed in the Multiply Pipe, and which is going to read the elements of the Vector File V3 and multiply each element by the corresponding element of the Vector V4 and then write the result into Vector V5. The conflict here is between Vector V3 in the Multiply instruction with the results of the Add instruction. The newly written V3 in the Add instruction is used as a read operand for the Multiply instruction. The read operation must be subsequent to the write operation so that the desired information is written before it is read.

The second type of conflict, shown in FIG. 13 is the Read/Write conflict. Looking at two instructions in the middle of a program, there is again shown an Add instruction adding the contents of Vector register V1 to the contents of register V2 with the result going to register V3. The multiply instruction is V4 times V5 with the results to be placed in register V2. The conflict here resides in the contents of register V2, since while the Add operation is reading Vector File V2, the subsequent multiply instruction is attempting to write into the same V2 file. Since it is our desire to read the present contents rather than the newly written data, there is a Read/Write conflict. Now the reason for this conflict, is that the Add Pipe may have been delayed in reading those elements since this data in Vector register V1 may have been loaded from the High Performance Storage Unit (HPSU) by an earlier instruction to the Vector Load and for some reason a storage contention was encountered for the storage unit. Since this data was not available to the Add operation, it would have suffered a conflict of its own and there would have been a delay in the reading of data for the Multiply Pipe. An attempt would then be made to overrun the existing data with newly written data and a conflict would occur.

The third and last conflict is shown in FIG. 14. It is the Write/Write conflict. Again there is an Add instruction followed by a Multiply instruction. An example of this overwritng is where the C field which specifies the mask operation to be used with the Add instruction has a value of 0. The C field also specifies that the operation is to be performed on all elements of the Vector. For a C field = 0, every element in Vector V3 is to be written. Furthermore, for the multiply instruction, the C field is equal to one. This indicates that we only store into those elements of the destination Vector which have corresponding 1 bits in the Mask register. By doing this type of operation they can overlay or merge data in any manner by using the Mask. So for the valid type of operation within a program, the conflict that is encountered is the writing of data into Vector register V3 by the Add instruction and completing it by the time that the Multiply instruction is executed. They have to be done in the proper order so that the results of the Multiply operation show up in Vector register V3 when both of these instructions are completed. The operation then is a write followed by a subsequent write for a Write/Write conflict.

Figure 15:
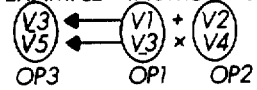
FIG. 15 is a still further pictorial diagram illustrating an example of how conflicts are detected.

To look at how these conflicts are actually detected, consider the example instruction sequence shown in FIG. 15. Again we have two instructions, an add and a multiply instruction and we look at the operand destinations. These are referred to here as operands 1, 2 and 3. Operand 1 is always the read operand, as is operand 2. Operand 3 is a destination operand. Operand 3 is common to both instructions. Now as is seen, the actual conflict with these instructions is a write where the Add instruction is writing to the Vector File, and in the Multiply instruction when it attempts to read in that same V3 file. To detect all of the possible conflicts between these pairs of instructions, five conflict detectors are needed. They are two Write/Read conflicts, two Read/Write conflicts and one Write/Write conflict. The first Write/Read conflict is the one that is actually in the present example. As shown, this is the Add Pipe Op 3 register which, in this case, is the Vector register V3. The read operation is the Multiply Pipes Op 1 register which, of course, is the same Vector register V3. Since they are the same register, there exists a potential conflict. The second Write/Read conflict that is tested for, is again the Add Pipe Op 3 register. In the multiply operation it would be the Multiply Pipe Op 2 register. The Read/Write conflict that has to be detected is the Add Pipes Op 1 register, which in the present instance is Vector File V1 and the write operation then would be the Op 3 register of the Multiply Pipe which in this case is Vector Register V5. The second Read/Write conflict would be the Add Pipes Op 2 register, or V2 in this example, and the conflict in this case would be the Multiply Pipes Op 3 register V5. The Write/Write conflict, of course, is the Add Pipe Op 3 and the Multiply Pipe Op 3 attempt to over write it. So there are five potential conflicts that have to be detected here.

To follow through with additional detail of how this conflict is actually detected, note that it involves the Add Pipes Op 3 File number and the valid bit. The valid bit is part of the Vector Control word that comes from the Instruction Flow Control (IFC) in the Scalar Processor Module. It indicates that the Op 3 is actually going to be used for this particular operation, because the results of a Vector/Vector Add always goes into a Vector File so the valid bit is set. So the valid bit is going to be actually used to enable the logic so that testing may be accomplished.

The other item that is used as a test standard is the Add Pipes Op 3 element counter. In this case, the counter is a late incremented write counter. This counter starts at 0 at the beginning of an instruction and is incremented whenever results are written into the Vector File. This element counter is really a word pair counter, that is, because the words are written into the element into the Vector Files in single precision then it really can be two elements while for double precision each element can be a word pair. This late incremented counter is used such that the counter is incremented only when results are actually written into the Vector File.

Note also that the Multiply Pipes Op 1 file number and the valid bit have to be compared against the Op 3 file number when an attempt is made to detect a Write/Read conflict. Here again the valid bit serves the identical function that it previously performed for the Add Pipe. Of course, there is a valid file number in use when the valid bit is set.

Note next that the read element counter of the Multiply Pipe is also used here. There is only one read element counter because, in most operations, both operands are read at the same time and are sychronized. The element counter denotes our position within a Vector File the location of which indicates which of the elements have been successfully read and which remain to be read for the particular instruction.

There is a bit that must be set in the Multiply Pipe activity snap shot register which indicates that the Add Pipe is active. The snap shot register includes an activity bit for each of the pipes in the conflict logic. Upon starting execution of an instruction, per a Vector Control word, the other five pipes are examined and if they are active then their corresponding bits are set in the Multiply Pipe activity snap shot register. The significance of which is that there is some instruction that must have occurred earlier in the program, but which is still active in the process of execution and there might exist a potential conflict with that instruction. As the five other pipes complete instructions they were executing, their corresponding activity bit is cleared in the Multiply Pipe, and in the other pipe snapshot registers. Any instruction that starts in the other five pipes after the reading of the Add Pipe register starts is ignored because they are instructions that occur later in the program and therefore cannot be in conflict.

The total equation for the detecting of this Write/Read conflict is first the comparison of the Add Pipe Op 3 file number and the Multiply Pipe Op 1 file number for equality. Since they are both Vector File V3, we have met that condition. Next, the AP Op 3 valid bit must be set, since if that is set this indicates that we do have valid operation going on for the Op 3. Further, the Multiply Pipe Op 1 valid bit must also be set since we are doing a read of the Multiply Pipe and the Multiply Pipe Op 1 element counter must be equal to or greater than the Add Pipe Op 3 element counter. As long as the Multiply Pipe element counter is less than the Add Pipe element counter then there is no conflict. Further, the Add Pipe activity bit must be set in the Multiply Pipe snapshot register in order to have the Multiply Pipe suffer the conflict.

Figure 16:
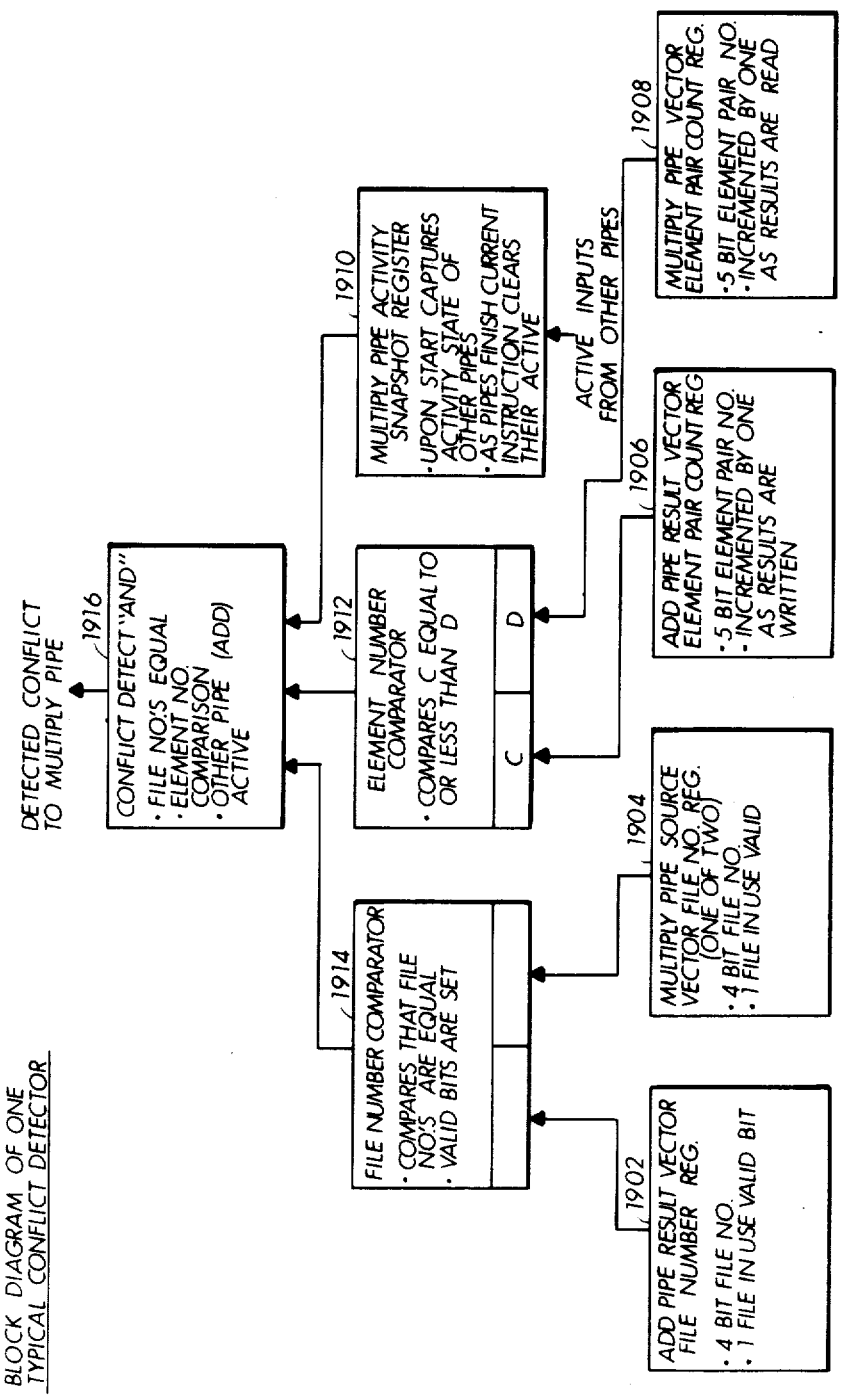
FIG. 16 is a simplified block diagram of a typical conflict detector.

Now look at the block diagram shown in FIG. 16 which depicts this same operation. This is a simplified block diagram of one typical conflict detector, there are many more like this, of course, within the conflict logic, however, we will look at only one of them. Let us start with the first block on the lower left. It is the Add Pipe result Vector File number registe 1902 which is the Op 3 file number. It is a four bit file number register. Additionally we have a one for the valid bit which denotes that that file is actually being used by that instruction. The adjacent block is the Multiply Pipe source Vector File number register 1904 for Op 1. This is the Op 1 file number, and includes a four bit file number and again a valid bit. Now those quantities are both compared in the block above which is the file number comparator 1914. It compares those file numbers that are equal and the valid bits are also set. If, indeed, they are equal there is an output sent over to the top block 1916. So as far as the file numbers and the valid bits are concerned there is a potential conflict.

Returning to the lower level, the third block is the Add Pipe result vector-element pair counter register 1906. This is a counter that starts at 0 and is only incremented when results are actually written into the Vector File for the Add instruction. It is a five bit element compare counter and it is incremented by one as each word pair of the results are written. The remaining lower level block is the Multiply Pipe vector read element pair counter register 1908. It is a five bit element pair counter and it is incremented by one as each word pair of the source operands are read. The two element pair counter values are then compared by the middle block in the second level 1912, to see if the Multiply Pipe element pair counter is equal to or greater than the Add Pipe element pair counter. If so, then we will have an output which indicates a potential conflict.

The third block in the second level is the Multiply Pipe activity snap shot register 1910. It has an input from each of the other five pipes into this register. Since the Add Pipe was active when we started the multiply instruction we captured its activity bit in this register and since the Add Pipe still has not finished its execution its ativity bit is set. Incidently the activity bit is clear whenever the Add Pipe finishes the current instruction. When this activity bit is cleared out and a subsequent instruction is started following the multiply operation the activity bit is not reset. The output of this snap shot register is sent to the conflict detector 1916 and we have a conflict if the file numbers were equal. If we do and the other pipe is active from the activity snap shot register then the final determination would be whether the element numbers are equal as a result of the element comparison. This detected conflict goes to the Multiply Pipe and tells it to stop operation and to freeze for at least 8 clock cycles. At the end of the eight cycles, we would take another look to see if the conflict is cleared. If it is still there we will freeze for another 8 clock cycles.

Next, we will look at the possible conflicts that must be detected throughout the entire machine. FIGS. 17, 18, and 19 are a set of tables of all of the various conflict detections that actually do occur in the Vector Control section. These are all on a single printed circuit board called a P6 card. If you recall from the master description we had 2 cards, a P5 and a P6 card whose functions were to detect these conflicts and we are looking now at what is on the P6 card on which we have the Write/Read and the Read/Write conflict detectors. Look first at the Write/Read conflict detectors, which here is called the first rank. These are the main chaining conflicts that are normally encountered in programs, wherein the results of one instruction are used as input/output operands in subsequent instructions. Down the side of the table, write operations are shown for various pipes. Along the top are the read operations of various pipes and these will see or suffer the conflict. Within the upper table of FIG. 17, there is an X shown where a conflict detection is not necessary. For example, the Add Pipe does not conflict with itself, nor does the Multiply Pipe. In previous examples, we looked at an Add Pipe Op 3 in conflict with a Multiply Pipe Op 1 or Op 2. A number 6 is noted at those intersections. These numbers in the appropriate boxes have to do with silicon chip circuit placement and there is a number in the box that means that a conflict detector exists at that crosspoint. While the Add Pipe, of course, does not conflict with its own Op 3 it may conflict with the other pipes, i.e. the Multiply Pipe or the Vector Load Pipes. The Vector Load Pipe has two destination operands, so it can be writing into two vector files, for example, with the load alternating elements instruction. There are a total of 46 conflict detectors in this chart.

There are additional conflicts that are detected by the Read/Write conflict detectors. A table shown in the FIG. 18 illustrates these conflicts for example the Add Pipe Op 3 cannot conflict with its own Op 1 or Op 2, it can conflict with the Multiply Pipes Op 1 and Op 2 as shown and with all other listed numbers. We have a total of 43 detectors in this table to detect read/write conflicts.

Next, consider the referenced second rank Write/Read conflict detector table in the lower portion of FIG. 17. This second rank is for the Add Pipe and Multiply Pipe because of long latency time.

Add and Multiply Pipe instructions are always started using the first rank conflict detection mechanism. The first rank has both source operand (Op 1 and Op 2) and destination (Op 3) conflict detection whereas the second rank has only destination conflict detection (Op 5). Upon successfully reading all the source operands for an instruction, the conflict detection is transferred to the second rank, if not busy. If the second rank is busy the pipe is prevented from starting a new instruction, as two are already active. Op 5 is the designation for destination operand for the second rank conflict detectors. The transfer from the first rank to the second rank consists of transferring the Op 3 value to Op 5.

Still referring to the lower table of FIG. 17, notice that the Add and Multiply Pipes can conflict with themselves. The second instruction could use the results of the first instruction and input operands. The other pipes could also be in conflict with the Add or Multiply Pipe instruction in the second rank. There are a total of 18 detectors in this second rank table of FIG. 17.

This is necessary for the case when two instructions are active in either the Add Pipe or the Multiply Pipe. If the first, or earlier instruction has an element count of sixteen or less, than a second instruction can be started into execution before the results of the first have seen written into the Vector File. For example, the second instruction in the Add Pipe, or instructions in the other pipes, can be in conflict with the first instruction in the Add Pipe. The Add and Multiply Pipes are constrained to allow only two instructions active in each, at a time, in order to limit the total number of conflicts to be deleted.

FIG. 19 illustrates three additional tables labelled possible conflict detectors. The top two are for the Vector Load Pipe and the bottom one is for the Vector Store Pipe. They detect the possibility of the conflict, rather than actual occurrance of a conflict, and they do that by comparing file numbers between certain pipes. Knowing that a conflict is not possible is necessary so that the Vector File time slots can be released by the Vector Load and the Vector Store Pipes in time to allow overlap use by a subsequet instruction. If a conflict is possible, the Vector File time slots must be retained until instruction completion preventing a subsequent instruction from being started immediately. For hardware simplicity the main method of detecting if a conflict is possible is to examine the activity snapshot register. If another pipe is active then a conflict is assumed to be possible. This simple scheme works reasonably well for pipes that process operands at the same rate. The Vector Load and Vector Store pipes run at twice the rate of the other pipes. The other pipes generally run at two elements per clock cycle or 32 clock cycles for a full 64 element Vector File whereas, the VL and VS pipes can complete a full Vector File in 16 clock cycles. Comparing the actual file numbers plus the pipe active provides a more definitive test.

The P5 card is the other card of the card pair and it has all of the other conflict detection mechanisms on it. These conflicts detected on this second card is shown in FIG. 20 and has the Write/Write conflict detectors. The pipe active snap shot registers are also on this card. The tables then shows that the Write/Write conflict detectors are organized in the same manner as the previous ones. Referring to the tables of FIG. 20, note that the late incremented counters are shown on the left side of the table. The early incremented counters are shown across the top, which is also the pipe that suffers the conflict, when detected. There is a total of 28 detectors shown in the table on the left. The other table shown in FIG. 20 has a total of 8 detectors. They are for detecting second rank conflicts between the other pipes and AP and MP OP 5. This second card (P5), has a total of 36 detectors (28+8) and since there are 131 on the P6 card that results in a grand total of 167 conflict detectors for the total conflict mechanism.

Next we will look at a block diagram shown in FIG. 21. It is a block diagram for the Vector File conflict detection mechanism. It shows the complete conflict logic and also the partitioning onto the two cards P5, P6. A dotted line down the middle of the FIG. 21 represents the card boundary. The blocks on the left are on the P6 card and those on the right are on the P5 card. In the block at the bottom left there is illustrated the file number and valid bit registers 1920 for Op 1, 2, 3, 4, and 5 for all of the six pipes. The file numbers and valid bits come from the Vector Control instruction receive register which holds the Vector Control word. The file numbers and valid bits are clocked into these registers upon starting an instruction and held until the instruction is completed. The next block includes the element counters for read operands, OP 1 and OP 2, 1922 for those pipes that perform vector file read operations. The load pipe is a single read counter. The counters are set to a value of zero by vector control upon start of an instruction to represent the first word pair of the particular vector file. Incrementing of the counters is controlled by the operand sequencing control of the individual pipes, which is illustrated by one of the inputs into the block. Normally the counters are incremented each clock cycle during successful execution of an instruction by a pipe. When a conflict is detected the pipe temporarily halts execution of the instruction until the conflict is resolved.

Incrementing of that pipes element counters are also temporarily halted directly by the conflict detect mechanism, as illustrated by the other input to the block. The next block is the late incremented element counters 1924 for the write operands which are Op 3, Op 4, and Op 5. The Add Pipe and the Multiply Pipe have both an Op 3 and an Op 5 element counters. The SC pipe and the move pipe have an Op 3 and the Vector Load pipe has both an Op 3 and an Op 4. The late incremented element counters 1924 are initialized to a value of zero upon start of an instruction and are incremented under control of the operand sequencing control of the individual pipe as destination operands are written into the Vector File. The next block in the bottom row is for the early incremented element counters 1926 for the write operands. There include only the Op 3 and Op 4 counters. These counters are intialized to a value of zero upon start of an instruction and are incremented under control of the operand sequencing control of the individual pipe operand sequencing control. The incrementing occurs at the same time as the corresponding read operands are successfully read from the vector files. The next level of blocks on the left (P6 card) represent the write/read 1928 and the read/write conflict detectors 1930. They are constructed of special gate arrays, that will be described later, that actually make the file number comparison, the valid bit comparison and compare the element counter values to determine whether an actual conflict has occurred. Another input to these blocks is from the pipe activity snap shot registers 1940 which are on the P5 card. The output of the two conflict comparator blocks 1928, 1930 then enters the conflict consolidation block 1932 directly above. Basically all of these conflicts are brought together by a plurality of OR gates. Some of this OR gating is also done in the conflict comparator gate arrays because each has four separate detectors, in addition to a level of OR gates. Some of the outputs of the conflict consolidation block 1932 go directly to each pipe. The pipes each have an additional level of OR gates each with 4 inputs. The inputs are the three conflict types plus a signal, which will be described later, to hold the conflict active of 8 cycles once detected. An active signal into one of these inputs into the OR gates causes the pipe to immediately suspend operations (freeze). The other output from the conflict consolidation block goes to the conflict resolution delay sequences block 1952 on the P5 card. There is one of these resolution delay sequences for each of the pipes. Their function is to stretch out the conflict for a full 8 clock cycles once detected. The actual conditions that cause the conflict may be resolved or cleared in one clock cycle or may remain for many clock cycles.

Next refer to the right side portion of FIG. 21 which depicts the P5 card. Refer to the block 1942 labelled file number and valid bit registers for Ops 3, Op 4, and Op 5. There are no Op 1 or Op 2 read operand file number or valid bit registers because this area of logic deals strictly with Write/Write conflicts. The file number and valid bits come from the Vector Control instruction receive register which holds the vector control word. These registers are clocked at the same time as on the P6 card upon starting execution of an instruction and held until the instruction is completed. The next block 1944 to the right includes the late incremented element counters for write operands, Op 3, Op 4, and Op 5. They are identical to those on the P6 card and are just another copy used for electrical drive purposes. The next block to the right 1946 includes the early incremented element counters for write operands Op 3 and Op 4. They are also identical to those on the P6 card and are just another copy used for electrical drive purposes. The remaining block in the bottom row 1940 represents the pipe active snap shot registers. There is one active snapshot register for each of the pipes. Upon starting an instruction in a pipe that snapshot register 1940 captures the active state of all the other pipes. The significance is that if other pipes are active then they are executing instructions that have occurred earlier in the program and potential conflict conditions exist. The bits within an activity register are cleared as the corresponding pipe completes execution of the instruction that caused the activity bit to be set. The block in the middle row 1948 includes the Write/Write conflict comparators. They are similar to and functions in the same manner as the Write/Read and Read/Write comparitors on the P6 card. The block on the upper right 1950 includes the conflict consolidation logic which is similar to and functions in the same manner as the one on the P6 card.

Figure 22:
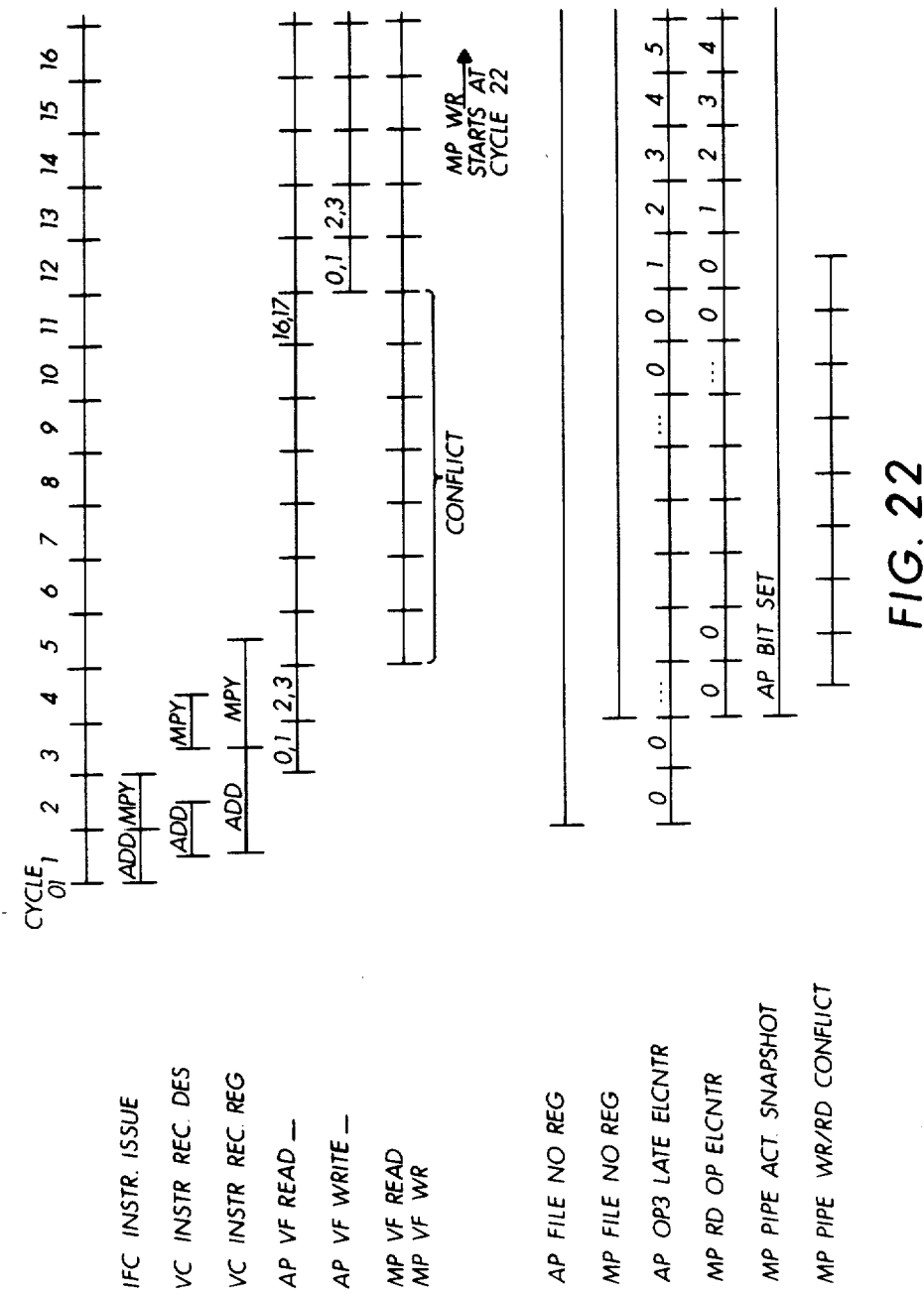
FIG. 22 is a timing diagram illustrating the issuance of an add and a multiply instruction from the control portion of the Instruction Flow section of the Vector Processor Module.

Next we will look at the example of a Write/Read conflict shown in the timing diagram on FIG. 22 to better illustrate how conflicts are detected and resolved. The example is for a vector add instruction immediately followed by a vector multiply instruction where the results of the vector add are used as an input to the vector multiply. This is a typical situation that is encountered in programs and is termed chaining.

The horizontal line at the top of FIG. 22 is subdivided into equal lengths which represent elapsed time in clock cycles. Along the left side of FIG. 22 are the names of hardware entities or events that depict the example. The first one on top labelled IFC Instruction Issue shows the two instructions being issued by the Instruction Flow Control (IFC) in the Scalar Processor Module. The next two lines labelled VC Instruction Receive Designator and Register show the instruction being received from IFC and in the process of being issued to the Add and Multiply Pipes for execution.

Assume that both of the pipes are initially idle and able to start immediately. The Add Pipe starts first and the Multiply Pipe starts two clock cycles later. The next line labelled AP VF Read shows Op 1 and Op 2 source operand data being read from the Vector Files. During the first clock cycle of reading, or clock cycle 3, word pair 0,1 are read from the Vector Files. During each successive clock cycle the next succeeding word pair is read from the Vector Files. The next line labelled AP VF Write shows the Op 3 destination, or result, operand for the Add Pipe being written into the Vector Files. The first write occurs during clock cycle 12. The nine cycles between the reading of the first source operands to writing of the first result is due to the latency time of the Add Pipe. During the first clock cycle of writing word pair 0,1 are written into the Vector File. During each successive clock cycle the next succeeding word pair is written into the Vector Files.

The line labelled AP Op 3 Lte ELCNTR shows the Add Pipe late incremented element pair counter in the conflict detect logic. The counter is cleared to zero at the start of clock cycle 2. The counter remains at zero until clock cycle 12 when it is incremented to one, as the first results of the vector add are written into the Vector Files. It is incremented by one each successive clock cycle as results are written into the Vector Files until the instruction is completed.

The line labelled AP File Number Register shows the file numbers and valid bits for the add pipe operands Op 1, Op 2, and Op 3 being captured in the conflict detect logic. This occurs at the beginning of clock cycle 2, just as the Add Pipe is starting execution of the vector add instruction. For our example assume that the destination operand Op 3 for the vector add instruction is Vector File number 3 or V3.

The next line labelled MP File Number Register shows the file numbers and valid bits for the multiply pipe operands Op 1, Op 2, and Op 3 being captured in the conflict detect logic. This occurs at the beginning of cycle 4, or two cycles after the same event for the Add Pipe. For our example assume that the multiply instruction source operand Op 2 is also vector file number 3 or V3. A Write/Read conflict condition then exists for the Multiply Pipe.

The line labelled MP Pipe Activity Snapshot shows the multiply pipe activity snapshot register in the conflict detect mechanism. The snapshot register is conditioned at the beginning of clock cycle 4. The Add Pipe is active at that time so the AP bit is set in the multiple pipe snapshot register. The line labelled MP RD OP ELCNTR shows the multiply pipe read operand element pair counter in the conflict detect logic. The counter is cleared to a value of zero at the start of clock cycle 4 and remains so until clock cycle 13 when the first word pair of operands have been successfully read from the Vector Files. The bottom line labelled MP Pipe WR/RD Conflict shows a multiply pipe conflict being detected during clock cycle 4 and lasting a total of eight clock cycles. The conflict is resolved or cleared during clock cycle 12 when the add pipe late incremented Op 3 element pair counter is incremented to a value of one. The line labelled MP VF Read shows eight cycles of don't care reads of the vector files starting at clock cycle 5. The first successful read occurs during clock cycle 13 and continues on successive clock cycles. The line labelled MP VF WR shows writing of the first multiply pipe result into the destination or Op 3 vector file on clock cycle 22. The writing continues on successive cycles until the vector multiply instruction is completed.

Figures 26A, 27:
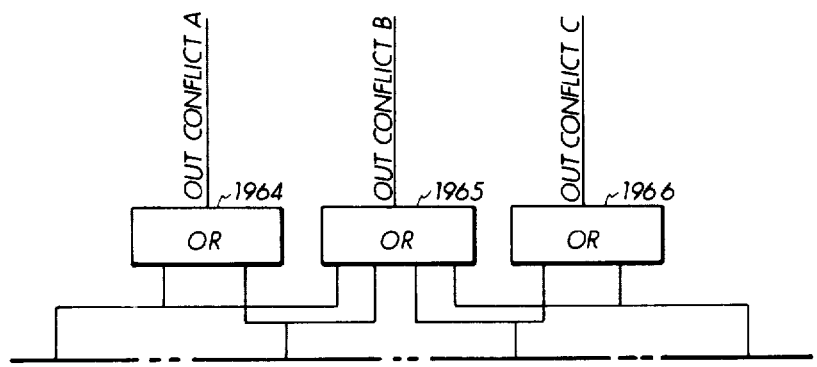
Figure 30:
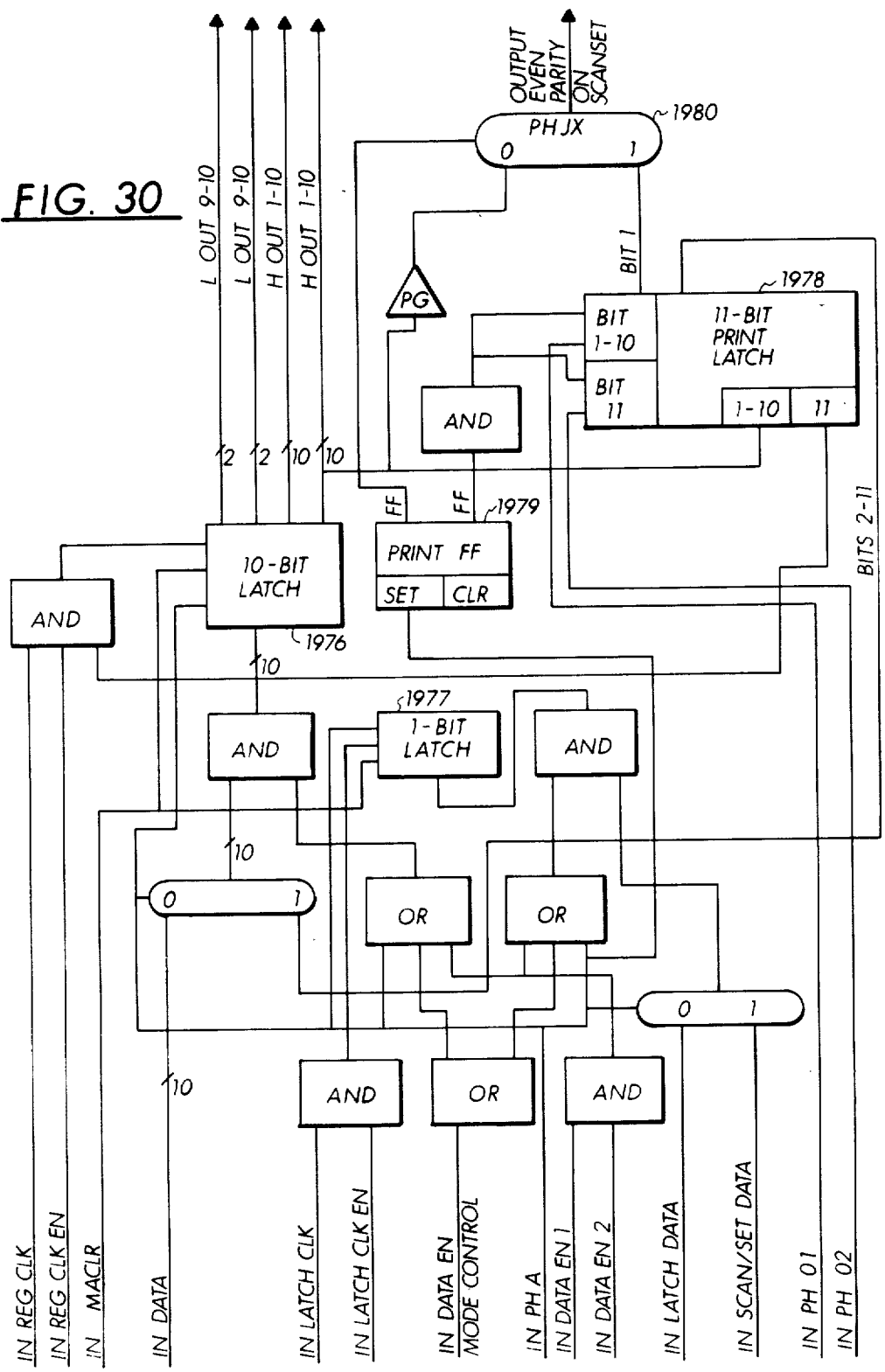
FIG. 30 is a logical block diagram of the 10 bit register with a clock enable latch such as might be used in the conflict detection mechanism of FIG. 16.

The = compare networks outputs are active when the respective bits of each of the compared inputs are equal (e.g., A1=E1, A2=E2, ... ). The ≧ compare networks outputs are active when the greater than or equal condition is satisfied. (See FIG. 27 Truth Table)

The following 3 expressions define the 3 outputs 1964, 1965, and 1966 of the Conflict Detect Comparator gate array (assumes negative logic):

| | | |
|---|---|---|
| OUT CONFLICT A = (1964) | (A = F) | * (B ≧ H) * (IN-CONFLICT ACTIVE A) * (IN CONFLICT ACTIVE C) * (IN FORCE H GT B AND D) + |
| | (A = E) | * (B ≧ G) * (IN CONFLICT ACTIVE B) * (IN CONFLICT ACTIVE D) * (IN FORCE G GT B AND D) |
| OUT CONFLICT B = (1965) | (A = F) | * (B ≧ H) * (IN CONFLICT ACTIVE A) * (IN CONFLICT ACTIVE A) * (IN FORCE H GT B AND D) + |
| | (A = E) | * (B ≧ G) * (IN CONFLICT ACTIVE B) * (IN CONFLICT ACTIVE D) * (IN FORCE G GT B AND D) + |
| | (C = E) | * (D ≧ G) * (IN CONFLICT ACTIVE B) *(IN CONFLICT ACTIVE F) * (IN FORCE G GT B AND D) |
| OUT CONFLICT C = (1966) | (C = F) | * (D ≧ H) * (IN CONFLICT ACTIVE A) * (IN CONFLICT ACTIVE E) * (IN FORCE H GT B AND D) + |
| | (D = E) | * (D ≧ G) * (IN CONFLICT ACTIVE B) * (IN CONFLICT ACTIVE F) * (IN FORCE G GT B AND D) |

For the sake of completeness, there is additionally shown FIGS. 23, 24 and 25 which provide additional information about the Vector Control word.

FIG. 23 illustrates complete detailed information about the format of the Vector Control word with each of the fields and each of the fifty-six bits explained.

FIG. 24 is an example of the decode of a program instruction to the Vector Control word format. In particular, an add instruction is described with its specific VV format. The upper level blocks illustrate the instruction fields, while the lower level blocks show the number of bits contained in each of the defined fields.

FIG. 25 is another timing diagram showing the first possible conflict which may occur in a timing sequence for the issuance and start-up of a VV format add instruction. The first possible conflict in this example may occur following the receipt of the Vector Control Add Pipe Active Snapshot register input. This occurs in the third quarter of clock cycle 2 as shown in FIG. 25.

FIGS. 26, 27, 28, 29, 30 and 31 all relate to the detailed logic blocks illustrated in the simple conflict detector mechanism illustrated in FIG. 16.

CONFLICT DETECT COMPARATOR (FIG. 26)

This gate array contains:
a. Special purpose conflict detect comparator for the Scientific Data Processing system.
b. Independent selection of conflict outputs.
c. Capability to force outputs inactive.

This gate array consists of 8 different compare networks as shown in FIG. 26. The compare network outputs are combined as shown, with the various control lines into four AND gates 1960, 1961, 1962 and 1963 to produce the three active positive ouput signals. There are two control lines which have the effect of overriding the active states of the = and the ≧ logic networks (or forcing them to look inactive) "in force g gt (GREATER THAN B AND D)", and "IN FORCE H GT B AND D."

6-BIT COUNTER (FIG. 28)

This gate array contains:
a. 6-bit output latch
b. Three high-active outputs per bit
c. Output latch can be loaded from IN-DATA, Adder or lower register inputs
d. Output register can be synchronously cleared
e. MACLR to both upper and lower registers
f. Lower register with separate clock loaded from upper register
g. Two's complement Adder with IN-ADDER DATA, and lower register as inputs
h. Overflow and underflow detection on Adder, when Adder is selected as input to upper register
i. Separtes SS output The 6-bit counter has 3 high-active outputs per bit. The upper (output) register 1967 can be loaded by IN-DATA, the Adder 1968, or the lower register 1971, or it can by synchronously cleared. The upper and lower registers 1967, 1971 have separate clocks and clock enables. The lower register 1971 can only be loaded from the upper register 1967. These upper and lower conditions are shown in FIG. 29.

The Adder 1968 is a two's complement Adder (subtracter) that will add (subtract) the 4 input bits of IN-ADDER Data to the 6-bit lower register 1971 with the result being one of the 4-way MUX 1970 inputs to the upper register 1967. The 4 input Adder data bits will be added (subtracted) to the least significant 4 bits of the lower register.

The overflow 1975 and underflow 1974 outputs will only be active when the Adder is selected as the input to the upper register.

| IN ADDER MODE CONTROL | ADDER FUNCTION |
|---|---|
| L | ADD |

| IN ADDER MODE CONTROL | ADDER FUNCTION |
|---|---|
| H | SUBTRACT |

The equations for over flow and underflow are as follows:

Underflow=EAC o SEL ADDER o Subtract
SEL ADDER=UPPER SEL 2 o UPPER SEL 1
EAC=P1 o (G1+G2+(P2P3o(G3+P4o(G4+G5+P5P6o(G6+ADDER MODE CTRL)))))
FOR n=3 Through 6
Pn=LWR REGn+(IN ADD DATA$_n$+ADDER MODE CTRL)
Gn=LWR REGn o (IN ADD DATA$_n$+ADDER MODE CTRL)
For n=1 Through 2
Pn=(LWR REGn+ADDER MODE CTRL)
Gn=(LWR REGn o ADDER MODE CTRL)

There is a 12-bit scan/set register 1969 where the upper 6 bits (7-12) are loaded from the upper data register 1967 and controlled by PH B upper and the lower 6 bits (1-6) are loaded from the lower data register 1971 and controlled by PH B lower. Scan/set out is bit 0 of the scan/set register.

MACLR will clear the upper and lower data registers to zeroes and will clear the scan/set register 1969 to a 010101010101 pattern.

NOTE: The control of the clocks, Normal, SS, and MACLR must be done externally to the gate array. There are no interlocks built within the gate array; simultaneous activation products indeterminate results.

10-BIT REGISTER WITH CLOCK EN LATCH (FIG. 30)

This gate array contains:
a. 10-bit latch with two high-active outputs per bit
b. Two low-active outputs per bit for bits nine and ten of the latch
c. Clock to 10-bit latch enabled by a 1-bit latch being set
d. Separate clock and clock EN for 1-bit latch
e. Three bits control data enable to 10-bit and 1-bit latch
f. Low-active 10-bit parity output
g. Scan/Set output multiplexed with parity output
h. MACLR of scan/set and data registers
i. Scan/set register will clear to 01010101010 pattern when MACLRed The 10-bit register with Clock Enable Latch consists of two registers, one of ten bits 1976 and one of 1-bit 1977. The 1-bit register 1977 called the CLOCK ENABLE Latch has as its input the input pin IN LATCH DATA. The CLOCK ENABLE LATCH Clocking is controlled by the inputs IN LATCH CLOCK and IN LATCH CLOCK ENABLE. Both pins must be active in order to clock data into the CLOCK EN LATCH. The 10-bit register 1976 has as its data inputs the input pins IN REG DATA 1-10. The clocking of the 10-bit register 1976 is controlled by the CLOCK EN LATCH and the input pins IN REG CLK and IN REG CLK EN. The input pins IN REG CLK and IN REG CLK EN must be active and the CLOCK EN LATCH must be set in order to clock data into the 10-bit register. The DATA ENABLES to the 10-bit register and the CLOCK EN LATCH must be active in order to clock data to the register and latch. The DATA ENABLES are controlled by the input pins IN DATA ENABLE MODE CONTROL, IN DATA EN 1 and IN DATA EN 2. The ENABLES are decoded according to the following table.

| MODE CON-TROL | DATA EN 1 | DATE EN 2 | GATE TO 10-BIT REGISTER | 1-BIT LATCH |
|---|---|---|---|---|
| L | L | L | IN REG DATA | IN LATCH DATA |
| L | L | H | IN REG DATA | 0'S* |
| L | H | L | IN REG DATA | 0'S* |
| L | H | H | IN REG DATA | 0'S* |
| H | L | L | IN REG DATA | IN LATCH DATA |
| H | L | H | 0'S** | IN LATCH DATA |
| H | H | L | 0'S** | IN LATCH DATA |
| H | H | H | 0'S** | IN LATCH DATA |

*Activation of Latch Lock and Latch Clock EN will force 10 bit register to hold last Clocked Data Pattern.
**Register output will clock to zeros. Enables A parity output is provided for the 10-bit register. The parity output will be "Low" when the combination of the examined 10 bits are an even number of ones.

The scan/set mechanism is controlled and maintained by 5 pins; IN SCAN/SET DATA, IN PH A, IN Ph B1, IN PH B2, and OUT EVEN FAR/SS OUT (SS output data). The operation is a left shifted one as shown the Figure Block Diagram. PH B1 controls the colcking of the 10-bit register into bits 1 thru 10 of the maintenance register. PH B2 controls the clocking of the CLOCK EN LATCH into bit eleven of the maintenance register. As shown in the Figure Block Diagram, the scan/set output dasta is multiplexed with the 10-bit parity signal. This multiplexing is controlled by a maintenance flip-flop which is set by PH A and cleared by PH B1. This flip-flop also controls the blearing of the scan/set register b the input pin in MACLR.

| Maintenance FF Set | Does not allow clearing of the SS register by IN MACLR. SS output is gated out. |
|---|---|
| Maintenance FF Clear | Allows clearing SS register to 01010101010 pattern by IN MACLR. 10-bit parity is gated out. |

The input pin IN MACLR when active will also clear the 10-bit register and the CLOCK EN Latch to 0's.

NOTE: The control of the clocks, Normal, Scan/Set, and MACLR must be done external to the gate array. There are no interlocks built within the gate array; simultaneous activation produces indeterminate results.

It will be understood from the foregoing description that various modifications and changes could be made in the preferred embodiment of the present invention without deparing from its true spirit.

It is therefore intended that the foregoing description of the preferred embodiment is for purposes of illustration only and should not be construed in a limiting sense. The scope of this invention should be limited only be the language of the following claims.

I claim:

1. In a multiple pipelined vector digital data processing system having an instruction repertoire including a plurality of instructions which can be simultaneously programmed and executed in a desired sequence in its multiple pipelines, each pipeline having associated therewith, one or more conflict detection and resolution mechanisms comprising:
   a first result register means for storing a first file number;
   a second source register means for storing a second file number;
   a first comparator means separately coupled to said first and said second register means to receive and compare the separate contents respectively contained therein;
   a third register means for storing a first element pair count;
   a fourth register means for storing a second element count;
   a second comparator means separately coupled to said third register means and to said fourth register means to receive and compare the separate element pair count contents respectively contained therein;
   a separate pipeline activity snapshot register means, associated with each of said pipelines, coupled to each of the other of said multiple pipelines to receive and store an active or non-active condition signal of each of the other of said multiple pipelines; and
   an AND gate means separately coupled to said first comparator means, to said second comparator means and to the separate pipeline activity snapshot register means, said AND means indicating the detection of a conflict when it is activated by the simultaneous presence of active signals from said first comparator means, said second comparator means and said separate pipeline activity snapshot register.

2. The invention as set forth in claim 1, wherein one of said multiple pipelines is an Add Pipeline and said first register means contains a four bit number indicative of the resulting vector file number produced by said Add Pipeline.

3. The invention as set forth in claim 1, wherein one of said multiple piplelines is a Multiply Pipeline and said second register means comprises two registers each of whose contents is a four bit number indicative of the source of the vector file number produced by said Multiply Pipeline.

4. The invention as set forth in claim 1 wherein each of the first and second register means includes a validity bit indicative of one file being in use.

5. In a multiple pipelined vector digital data processing system having an instruction repertoire including a plurality of instructions which can be simultaneously programmed and executed in a desired sequence in the multiple pipelines, each pipeline having associated therewith, one or more conflict detection and resolution mechanisms comprising:
   a first register means for storing a pipeline result vector file number;
   a second register means for storing a pipeline source vector file number;
   a first comparator means separately coupled to said first register means and to said second register means to receive and compare the separate vector file number contents therefrom;
   a third register means for storing an add pipeline result vector element pair count;
   a fourth register means for storing a multiply pipeline vector element pair count;
   a second comparator means separately coupled to said third register means and to said fourth register means to receive and compare the separate vector element pair count contents therefrom;
   a separate multiple pipeline activity snapshot register means, associated with each of said pipelines, coupled to each of the other pipelines of said multiple pipelines to receive and store an active or non-active condition signal of each of the other of said multiple pipelines;
   a conflict detecting AND means separately coupled to the first comparator means, to the second comparator means and to the separate multiple pipeline activity snapshot register means, said conflict detecting AND means indicating the detection of a conflict when it is activated by the simultaneous presence of active signals from said first comparator means, said second comparator means and said separate multiple pipeline activity snapshot register.

6. The invention as set forth in claim 5, wherein one of said multiple pipelines is an Add Pipeline and said first register means contains a four bit number indicative of the resulting vector file number produced by said Add Pipeline.

7. The invention as set forth in claim 5, wherein one of said multiple pipelines is a Multiply Pipeline and said second register means comprises two registers, each of whose contents is a four bit number indicative of the source vector file number produced by the Multiply Pipeline.

8. The invention as set forth in claim 7 wherein each of the two registers of said second register means includes a validity bit indicative of one file being in use.

9. The invention as set forth in claim 5 wherein said third register means for storing an add pipeline result vector element pair count and said fourth register means for storing said multiply pipeline vector element pair count each includes means for storing a multiple bit element pair number and also includes means for incrementing the multiple bit element pair number by one.

10. In a multiple pipelined vector digital data processing system having an instruction repertoire including a plurality of instructions which can be simultaneously programmed and executed in a desired sequence in the multiple pipelines, each pipeline having associated therewith, one or more conflict detection and resolution mechanisms comprising:
   a first register means for storing a pipeline result vector file number;
   a second register means for storing a pipeline source vector file number;
   a first comparator means separately coupled to said first register means and to said second register means to receive and compare the separate vector file number contents therefrom;
   a third register means for storing an add pipeline result vector element pair count;
   a fourth register means for storing a multiply pipeline vector element pair count;
   a second comparator means separately coupled to said third register means and to said fourth register means to receive and compare the separate vector element pair count contents therefrom;

a separate multiple pipeline activity snapshot register means, associated with each of said pipelines, coupled to each of the other pipelines of said multiple pipelines to receive and store an active or non-active condition signal of each of the other of said multiple pipelines;

a conflict detecting AND means separately coupled to the first comparator means, to the second comparator means and to the separate multiple pipeline activity snapshot register means, said conflict detecting AND means indicating the detection of a conflict when it is activated by the simultaneous presence of active signals from said first comparator means, said second comparator means and said separate multiple pipeline activity snapshot register.

11. The invention as set forth in claim 10 wherein one of said multiple pipelines is an Add Pipeline and said first register means contains a four bit number indicative of the resulting vector file number produced by said Add Pipeline.

12. The invention as set forth in claim 10 wherein one of said multiple pipelines is a Multiply Pipeline and said second register means comprises two registers, each of whose contents is a four bit member indicative of the source vector file number produced by the Multiply Pipeline.

13. The invention as set forth in claim 10 wherein each of the first and second register means includes a validity bit indicative of one file being in use.

14. The invention as set forth in claim 10 wherein said third register means and said fourth register means are each capable of storing a multiple bit element pair number and also means for incrementing the multiple bit element pair number by one.

15. In a multiple pipelined vector digital data processing system having an instruction repertoire including a plurality of instructions which can be simultaneously programmed and executed in a desired sequence in the multiple pipelines, each pipeline having associated therewith, one or more conflict detection and resolution mechanisms comprising:

a first register means for storing a pipeline result vector file number;

a second register means for storing a pipeline source vector file number;

a first comparator means separately coupled to said first register means and to said second register means to receive and compare the separate vector file number contents therefrom;

a third register means for storing an add pipeline result vector element pair count;

a fourth register means for storing a multiply pipeline vector element pair count;

a second comparator means separately coupled to said third register means and to said fourth register means to receive and compare the separate vector element pair count contents therefrom;

a separate multiple pipeline activity snapshot register means, associated with each of said pipelines, coupled to each of the other of said multiple pipelines to receive and store an active or non-active condition signal of each of the other of said multiple pipelines;

a conflict detecting means separately coupled to the first comparator means, to the second comparator means and to the separate multiple pipeline activity snapshot register means, said conflict detecting means indicating the detection of a conflict when it is activated by the simultaneous presence of active signals from said first comparator means, said second comparator means and said separate multiple pipeline activity snapshot register; and delaying means responsive to said conflict detecting means and positioned in each of said separate multiple pipelines to cause operation of a selected one of said conflicting pipelines to be delayed until said detected conflict has been resolved.

16. The apparatus as set forth in claim 15 wherein said delaying means further includes means for delaying operation of the selected conflicting pipeline for given time periods, each equal to n clock times.

17. The apparatus as set forth in claim 16 wherein said time periods equal to n clock times are multiples of 8 clock cycles.

* * * * *